(12) United States Patent
Kletter et al.

(10) Patent No.: US 8,233,722 B2
(45) Date of Patent: Jul. 31, 2012

(54) METHOD AND SYSTEM FOR FINDING A DOCUMENT IMAGE IN A DOCUMENT COLLECTION USING LOCALIZED TWO-DIMENSIONAL VISUAL FINGERPRINTS

(75) Inventors: Doron Kletter, San Mateo, CA (US); Eric Saund, San Carlos, CA (US); William C. Janssen, Jr., Mountain View, CA (US); Russel R. Atkinson, Aptos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1066 days.

(21) Appl. No.: 12/147,624

(22) Filed: Jun. 27, 2008

(65) Prior Publication Data

US 2009/0324100 A1  Dec. 31, 2009

(51) Int. Cl.
*G06K 9/68* (2006.01)
(52) U.S. Cl. ........ 382/217; 382/124; 382/125; 382/115; 382/100; 382/218
(58) Field of Classification Search .................. 382/124, 382/125, 115, 100, 217, 218, 305
See application file for complete search history.

(56) References Cited

U.S. PATENT DOCUMENTS

| | | | |
|---|---|---|---|
| 5,465,303 A | 11/1995 | Levison et al. | |
| 5,465,353 A | 11/1995 | Hull et al. | |
| 5,491,760 A | 2/1996 | Withgott et al. | |
| 5,613,014 A | 3/1997 | Eshera et al. | |
| 5,850,476 A | 12/1998 | Chen et al. | |
| 6,041,133 A | 3/2000 | Califano et al. | |
| 7,359,532 B2 | 4/2008 | Acharya et al. | |
| 7,844,594 B1 * | 11/2010 | Holt et al. | 707/709 |
| 2006/0104484 A1 | 5/2006 | Bolle et al. | |
| 2006/0285772 A1 | 12/2006 | Hull et al. | |
| 2008/0219560 A1 | 9/2008 | Morimoto et al. | |
| 2008/0317278 A1 | 12/2008 | Lefebvre et al. | |
| 2009/0176566 A1 | 7/2009 | Kelly | |

(Continued)

FOREIGN PATENT DOCUMENTS
EP  1850270 A1  10/2007

OTHER PUBLICATIONS

Lepetit et al: "Keypoint recognition using randomized trees", IEEE-PAMI, 2006.*

(Continued)

*Primary Examiner* — Matthew Bella
*Assistant Examiner* — Ruiping Li
(74) *Attorney, Agent, or Firm* — Fay Sharpe LLP

(57) ABSTRACT

An image management method and system provides for storing, indexing, searching, and/or retrieving image data. Keypoints are identified in images, including keypoints in a query image of a query document, and keypoints in potential target document images of a collection of potential target documents. Fingerprint information from the keypoints are generated, and the fingerprint information of a query image is compared with fingerprint information of potential target document images, found in the collection of potential target documents. A best match is determined between the fingerprint information of the query image and the potential target document images. At least one target document image is retrieved based on the determined best match. The retrieved at least one target image may then be displayed, printed or transmitted.

21 Claims, 24 Drawing Sheets

U.S. PATENT DOCUMENTS

2009/0324026 A1 12/2009 Kletter
2009/0324087 A1 12/2009 Kletter

OTHER PUBLICATIONS

Iwamura, et al., Improvement of Retrieval Speed and Required Amount of Memory for Geometric Hashing by Combining Local Invariants, Osaka Prefecture University, Japan, 10 pages, Proc. BMVC2007 (Sep. 2007).

Nakai, et al., Use of Affine Invariants in Locally Likely Arrangement Hashing for Camera-Based Document Image Retrieval, Graduate School of Engineering, Osaka Prefecture University, Japan, pp. 1-12, Lecture Notes in Computer Science (7$^{th}$ International Workshop DAS2006), 3872, pp. 541-552 (Feb. 2006).

Nakai, et al., Hashing with Local Combinations of Feature Points and Its Application to Camera-Based Document Image Retrieval—Retrieval in 0.14 Second from 10,000 Pages --, Graduate School of Engineering, Osaka Prefecture University, Japan, pp. 87-94, , Proc. First International Workshop on Camera-Based Document Analysis and Recognition (CBDAR2005), pp. 87-94 (Aug. 2005).

Nakai, et al., Camera-Based Document Image Retrieval as Voting for Partial Signatures of Projective Invariants, Graduate School of Engineering, Osaka Prefecture University, Japan, Proceedings of the 2005 Eight International Conference on Document Analysis and Recognition (ICDAR'05) 2005 IEEE, 5 pages.

Lowe, "Distinctive Image Features From Scale-Invariant Keypoints", Int. J. of Computer Vision, 2004.

Viola et al., "Rapid Object Detection Using a Boosted Cascade of Simple Features", Proceedings 2001 IEEE Conf. on Computer Vision and Pattern Recognition, CVPR 2001, Kauai, Hawaii, Dec. 8-14, pp. 511-518.

\* cited by examiner

```
<Fingerprint Data Base>_
  <Page ID="83">
    <Fingerprint Id="0">
      <r0="7777566342465232442556616616676777">
      <r1="6775363332363222442556616616676777">
      <r2="3461363667363222442546523244256777">
      <r3="4460363667363332442556634244251667">
      <r4="1460461667775332222577734223251667">
      <r5="1460361637675632632277766265226666">
      <r6="1440341336675333332477756445345666">
      <r7="1446346366677363362477756346245611">
    <Fingerprint Id="1">
      <r0="4466556665445773665251577466725664">
      <r1="1354042320265540771051577466725664">
      <r2="2565154431265540771044577366525664">
      <r3="7777154431042320771055666566526672">
      <r4="7777565431354320540046666577327742">
      <r5="7777265541154420650146656545351547">
      <r6="7777255143134022254744656645765576">
      <r7="7777256154135043265744655644765176">
  <Fingerprint Id=...>
    ...
```

FIG. 11

METHOD AND SYSTEM FOR FINDING A DOCUMENT IMAGE IN A DOCUMENT COLLECTION USING LOCALIZED TWO-DIMENSIONAL VISUAL FINGERPRINTS

BACKGROUND

The present application is directed to a computer operable system and method which incorporates a software program and algorithm for finding an image of a target document or document set in a large collection of documents, based on an image of a query document which is an imperfect copy of the target image. The query image may be captured by at least one of, but not limited to, a digital camera, personal data assistant, document scanner, text reader, video camera, motion picture film camera, computer, cell phone camera or other device capable of generating digital representations. The target image may be displayed on a monitor or a computer screen and its picture directly taken by one of the above devices, or the target image may first be printed on a printer or a similar output device and a picture taken by one of the above devices of the paper reproduction of the target image. Alternatively, the query image could be reproduced from a stored electronic version of the query image. Due to the manner and devices used to capture the query image, often the captured query image will be of a lower resolution, blurry, distorted by rotation and perspective, and of uneven lightness, as compared to the target image.

Thus the present application is directed to finding images of documents containing printed and/or handwritten words and other types of image content such as, but not limited to, line drawings and photographs, where the query image is typically of lower quality than the corresponding target image. The query and/or target images may be stored and retrieved from a computer memory, a database, buffer memory, or other computer operable medium.

Koichi Kise and the Intelligent Media Processing Group at Osaka Prefecture University have proposed a method to retrieve document images which includes the following steps:

1. Identify stable keypoints in an image which are likely to be found reliably both in target images and in query images. For images of documents, good keypoints are word pixel mass centroids or end points of a presented image. Keypoints are a consistently identifiable aspect of an object in an image. The keypoints are derived from the object appearance at particular interest points using localized image features. The keypoints are invariant to image scale and rotation, and are robust to changes in illumination, noise, occlusion, and small changes in viewpoint. In addition, keypoints are highly distinctive, relatively easy to extract with low probability of mismatch, and are easy to match against a (possibly large) database of local image features in close to real-time performance.
2. Form "fingerprints" that may represent the two-dimensional spatial arrangements of local neighborhoods of keypoints. A fingerprint is a string of quantized integers that encode certain distortion-invariant triangle area ratios among the keypoints in each neighborhood. Under a typical implementation, a fingerprint may be a series of integers quantized to the range of [0, 7]. A given target or query image may typically generate several thousand fingerprints depending on the document content. If the keypoints are very stable, the majority of these fingerprints will be identical between the target images and query images of the same document, while few fingerprints will match between the target images and query images of different documents.
3. At a pre-processing stage, a corpus (i.e., a main body or database) of collected target images is analyzed to extract the several thousand fingerprints from each image. For a very large corpus of images, with low probability, a given fingerprint may be found in multiple target images. The fingerprints are of high dimension which may be composed of a sequence of about 35 quantized integers in the range of [0, 7], which can be interpreted as a 35-dimensional vector space. They are hashed into a hashtable, whose entries contain lists of linked fingerprint records. Each fingerprint record contains the identity of a particular fingerprint, its value (the fingerprint string), and the identity of target images containing that fingerprint. The hashtable entry points to the first fingerprint record. In the event that more than one document contains the same fingerprint, the corresponding fingerprint records are linked to each other in a linked list chain, such that the entire list of records of a given hashtable entry can be followed sequentially by traversing the links.
4. At query time, fingerprints are extracted from the query image. Sequentially, each fingerprint is used as a key for looking up the hashtable content, to retrieve relevant candidate fingerprint records of target images. For each such fingerprint record, because of potential hashtable collisions, the query fingerprint string is compared with the target document fingerprint string. If there is an exact match with a particular target document fingerprint string, a vote count for that target image is incremented. The expectation is that many votes will accrue for correct matches between the query and candidate target image, and few votes will accrue for incorrect matches resulting from coincidental matching of a small number of fingerprints.

This method has been stated to be operable for databases of up to 20,000 images of document pages. However, at least the following shortcomings are considered to exist in the described method.

First, it is not clear that the method can scale from thousands to millions of images. In many cases, the fingerprints found in the query and correct target documents are not an exact match, but differ by one or a few digits due to noise and quantization errors. Hashing methods are not well suited to finding near-neighbors in a high-dimensional space, so the number of votes for a particular document can drop significantly because of such digit mismatches. One method to address this problem is by entering many additional records of the possible modified near miss fingerprint combinations. However, in practice this method can only be applied to a limited number of digit changes, since the number of possible fingerprint combinations grows exponentially with the number of single digit changes.

Second, the method relies on the ability to obtain the same order of keypoints in each local neighborhood in order to generate identical fingerprints between the query and target collection document. A common problem with the existing methods is that word centroids are often co-linear, as words are typically aligned along text lines, thereby making it difficult to determine the exact keypoint order. The ordering of a colinear set of keypoints by increasing angle, as most existing methods do, for example, is particularly prone to noise and rounding accuracy errors, leading to fewer correct fingerprint matches between the query and target document.

Still further, shortcomings of the above method will be set out, and methods and systems to overcome these shortcomings will be discussed in detail in the following pages.

INCORPORATION BY REFERENCE

The disclosures of U.S. patent application Ser. No. 12/147,867 for "System and Method for Finding Stable Keypoints in a Picture Image Using Localized Scale Space Properties", by Doron Kletter, filed Jun. 27, 2008; and U.S. patent application Ser. No. 12/163,186 for "System and Method For Finding A Picture Image In An Image Collection Using Localized Two-Dimensional Visual Fingerprints", by Doron Kletter, filed Jun. 27, 2008, are each hereby incorporated herein in their entireties.

BRIEF DESCRIPTION

An image management method and system provides for storing, indexing, searching, and/or retrieving image data. Keypoints are identified in images, including keypoints in a query image of a query document, and keypoints in potential target document images of a collection of potential target documents. Fingerprint information from the keypoints is generated, and the fingerprint information of a query image is compared with fingerprint information of potential target document images from among the collection of potential target documents. A best match is determined between the fingerprint information of the query image and the potential target document images. At least one target document image is retrieved based on the determined best match. The retrieved at least one target image may then be displayed, printed or transmitted, or its reference link or corresponding database address may alternatively be provided for future access.

BRIEF DESCRIPTION OF THE DRAWINGS

FIGS. 8A-8D are a magnified version of the Image Processing.

FIG. 11 is an illustration of the unpacked Fingerprint Data content.

DETAILED DESCRIPTION

Figure 1:
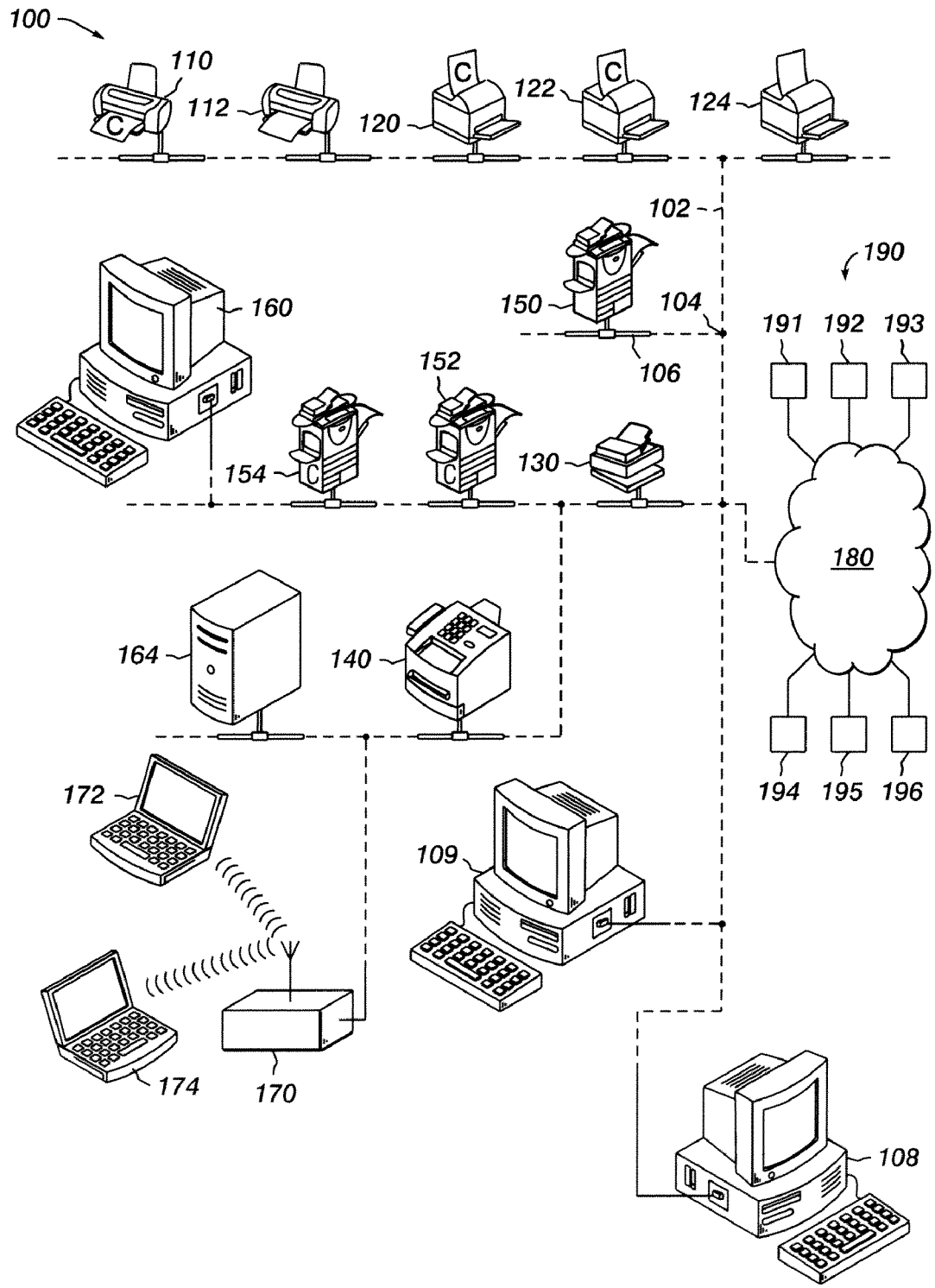
FIG. 1 sets out an environment in which the concepts of the present application may be implemented.

The system and method as described herein may work within the parameters of a computer network as illustrated in FIG. 1. The computer network 100 may be comprised of a series of wires 102, many of which may branch or join with a third wire 106 at a wire junctions 104, may connect a standalone peripheral device or pass through a peripheral to connect to other devices, such as computers 108, 109, wherein a computer may be considered a peripheral device. The network may incorporate a color printer 110 or other than color printer 112 as well as at least a color laser printer 120, 122 or one other than color laser printer 124. The network may also incorporate a scanner 130, or a fax machine 140, a photocopier 150, a color photocopier 152, or a combination color printer/scanner/fax machine 154. The network may also contain a personal computer and/or standalone computer terminal 160, or a standalone hard drive data storage medium 164. The network may also contain a wireless network transmitter receiver 170 and interface with at least one laptop computer 172, or a plurality of laptop computers 174. The network may also interconnect with any form of network 180 including but not limited to the Internet, an Intranet or other communication network. Through use of an interface with another form of network, the present system and method may interface with a plurality of peripheral data capturing devices 190 including, but not limited to a digital still camera 191, a digital video camera 192, a cellular telephone 193, a scanner 194, a personal data assistant 195, or a document indexing system 196. It is to be understood the present concepts may be implemented in networks having various combinations of the above components, going from a network having a single device to one which includes thousands or more connected devices. Further, various ones of the above components may have memory storage areas arranged in any of a number of known configurations which may be useful in implementing the concepts to be described. The storage areas may be RAM, ROM, Flash Memory or other memory types which can hold software incorporating the concepts of the present application. Other memory storage areas may be configured to hold various digital images in any of a number of database formats.

Still further, various ones of the components of FIG. 1, such as but not limited to the computers, include processors to process instructions from software loaded on or otherwise accessible by the components. It is to be understood various ones of the components having the processors may have more than one processor whereby processing of the instructions can be divided among the multiple processors. Alternatively, a single processor can operate to divide the instructions, whereby processing can occur in a multi-threaded environment.

Figure 2A:
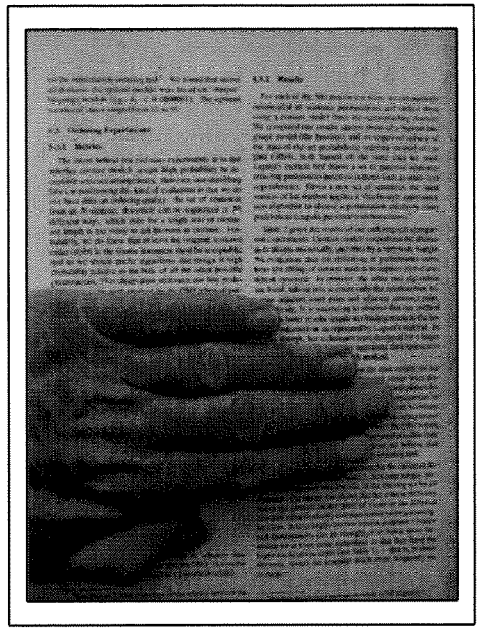
FIGS. 2A-2E are an illustration of a successful Query Match.
Figure 2B:
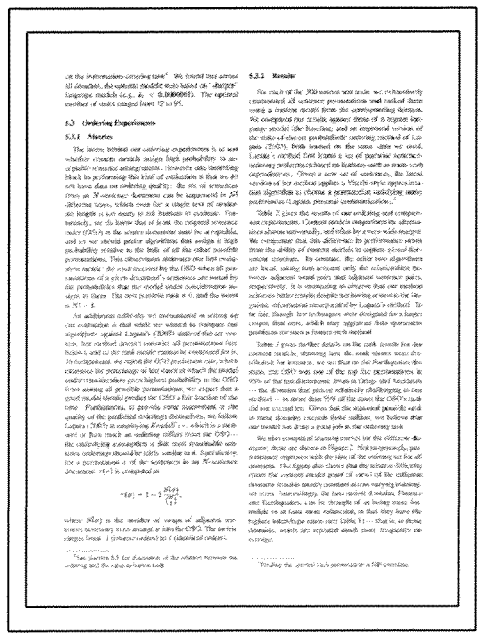
Figure 2C:
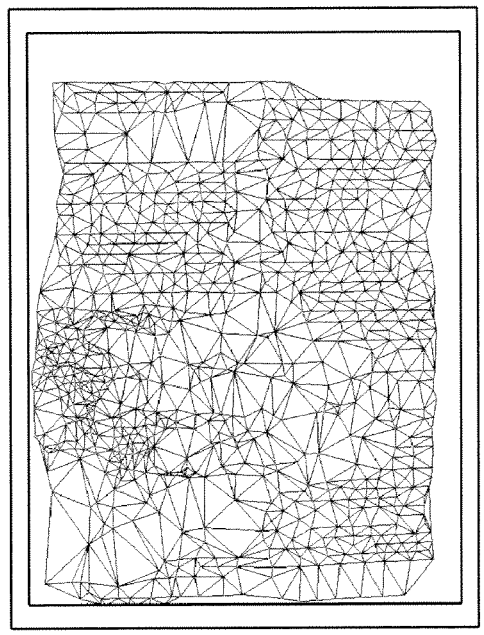
Figure 2D:
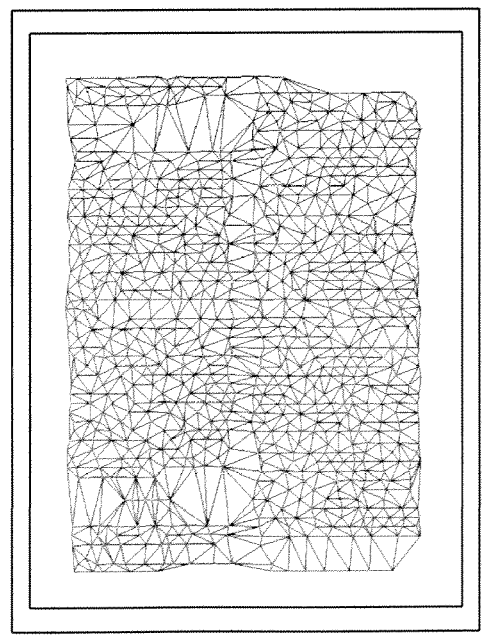
Figure 2E:
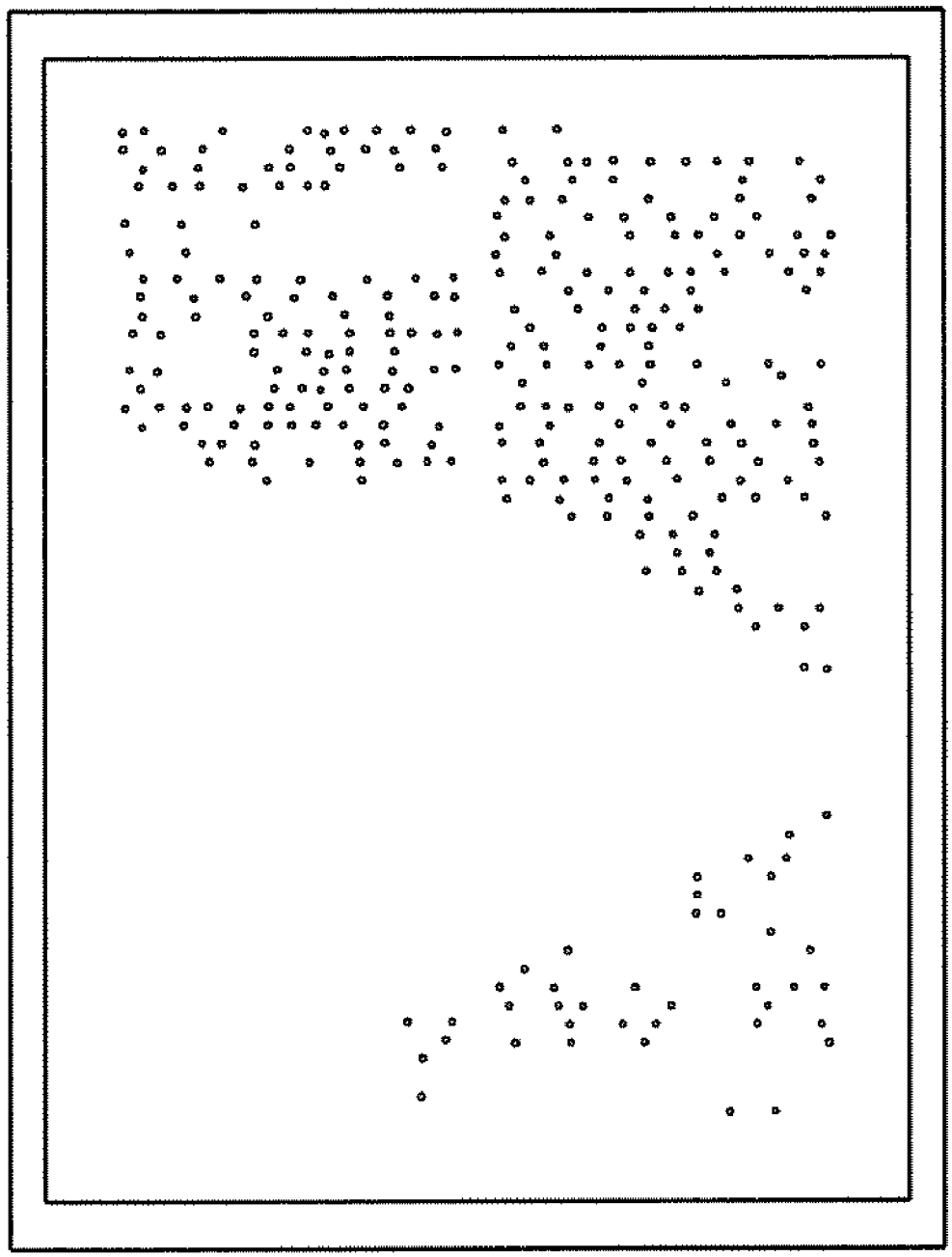

Turning now to FIGS. 2A-2E, illustrated is a successful image query search using the method and system of the present application. Initially, as shown in FIG. 2A, a query image is captured by a camera, scanner, or other such device or reproduced from a stored electronic version of a target image. The partial obstruction of a hand is intended to emphasize the concepts of the present application may be accomplished even in situations where the query image is in some manner degraded, including situations where a portion of the query image is partially occluded by other objects. FIG. 2B shows a similar extraction of keypoints for a target image which may be stored in a document collection. The query image is processed to extract word centroid keypoints as shown in FIG. 2C. The keypoints are the nodes in FIG. 2C, which are connected based on the results of triangulation operations. Because there are many fingerprint matches between the query image and the target image keypoints of FIG. 2D, and few fingerprint matches for other images (not shown), the correct target image is found. The dots in FIG. 2E represent the locations of matching fingerprints between the query image and target image. As can be seen, there is a lack of dots in the middle to lower left side portion of FIG. 2E. This lack of matches corresponds to the part of the image occluded by the presence of the hand in FIG. 2A.

Figure 3A:
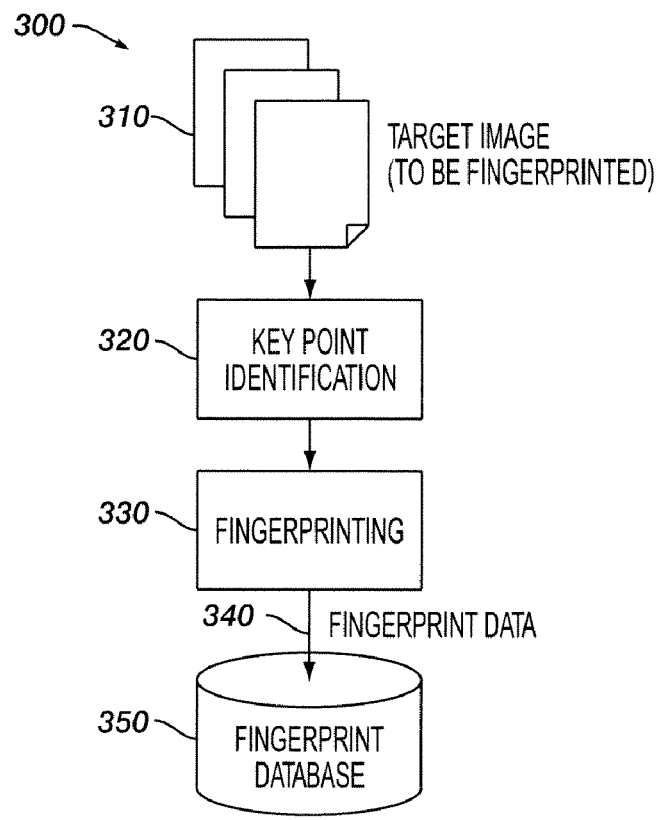
FIGS. 3A-3B show an overview of method of document collection preparation for finding documents using 2D Visual Fingerprints.
Figure 3B:
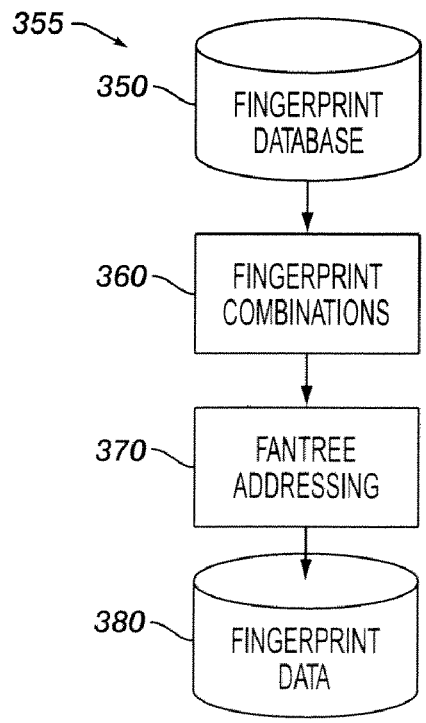
Figure 4:
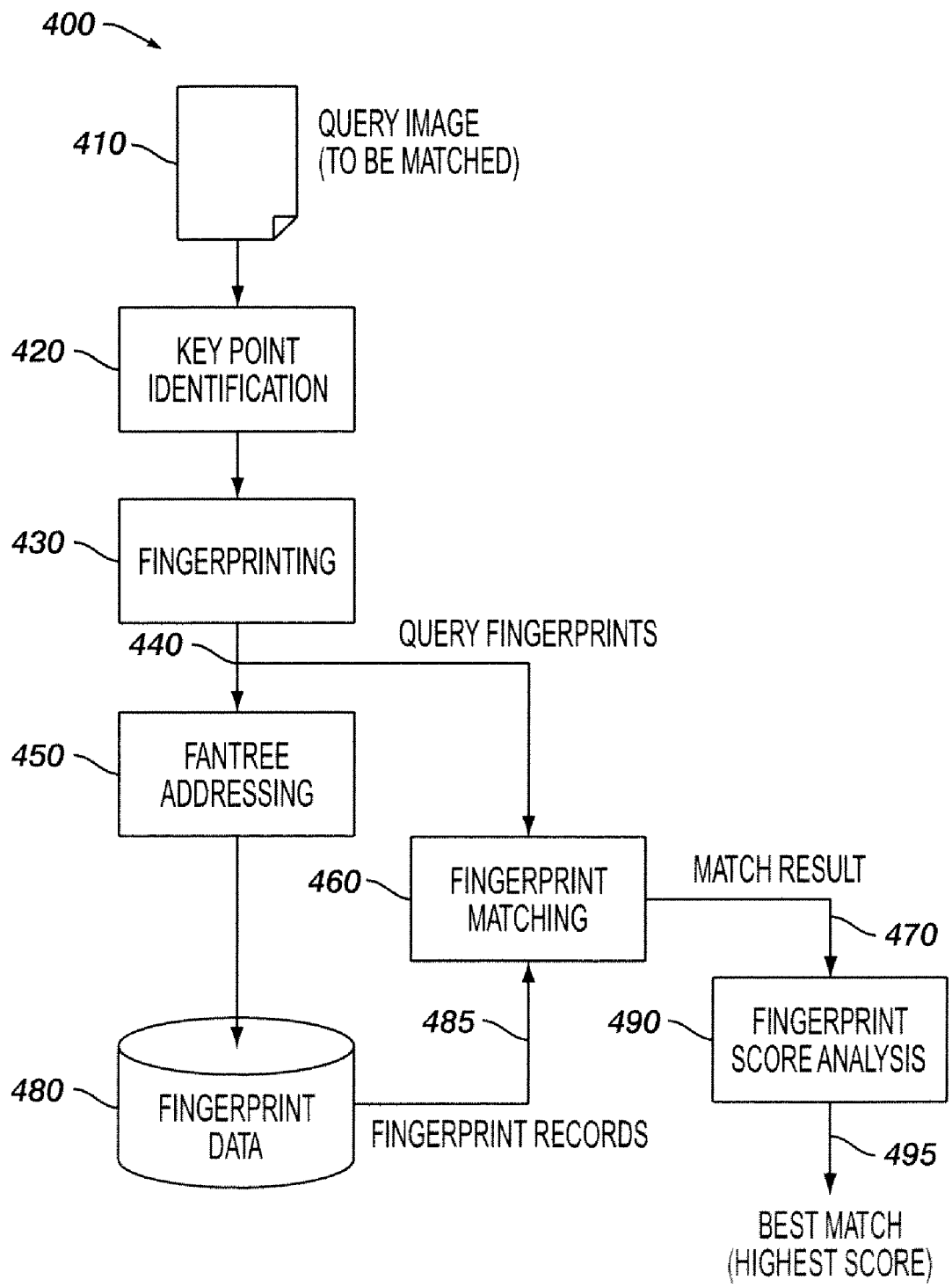
FIG. 4 illustrates continued operation for finding documents using 2D Visual Fingerprints.

A particular method and system of the present application is now outlined with reference to FIGS. 3A-3B and 4. It is to be appreciated FIGS. 3A-3B and 4 present an overview of the present system and method, and the concepts introduced in these figures will be explained in greater detail in the sections which follow.

In a pre-process flow diagram 300 of FIG. 3A, the content of a document collection is pre-processed to identify stable and repeatable keypoints. For each document in the collection of target images 310, keypoints are identified 320 and for each keypoint, fingerprint information is computed from local groups of keypoints by performing fingerprinting operations 330. The resulting fingerprint data information 340 is stored in a compact fingerprint database 350.

Next FIG. 3B provides a flow diagram 355 used to organize the fingerprint database 350. In this process, information having various Fingerprint combinations 360, is organized in a Fan Tree, in accordance with a Fan Tree Addressing method 370. A corresponding Fingerprint Data structure 380 is provided, in order to facilitate fast and efficient fingerprint matching. For each input fingerprint in the Fingerprint Database 350, a sequence of the candidate Fingerprint Combinations 360 is generated and stored in the Fan Tree 370 and corresponding Fingerprint Data structure 380. The purpose of the sequence of fingerprint combinations 360 is to allow one or more keypoints to be missing due to a possible transformation, such as affine transformation of the query image and still be able to correctly detect the fingerprint with high accuracy.

At query time, FIG. 4 illustrates performing a real-time image query 400 for a particular query image 410, by identifying keypoint locations 420 in the particular query image 410 and computing fingerprint information 430 for each query keypoint from local groups of query keypoints, matching the query fingerprints 440 to the existing Fan Tree fingerprint data 480 to determine the best matching document or set of documents within the collection. Each query fingerprint is used to calculate a Fan Tree address 450, which leads to a particular Fan Tree Leaf node list, containing a subset of the original document collection fingerprint records 485. Each original fingerprint from the subset list is in turn sequentially compared with the current query for fingerprint matching 460. Each time the query fingerprint matches one of the retrieved fingerprint records, a count of the number of matching fingerprints for that document is incremented. In addition, a score is assigned to each fingerprint match based on the fingerprint strength and how uniquely it correlates with the target fingerprints. Finally, a Fingerprint score analysis module 490 examines the resulting list of accumulated scores and counts of matching fingerprints 470 for each document to determine the best matching document or set of documents 495 within the collection that best matches the query image 410. An overall score is calculated for each matching document by combining the number of fingerprint matches and their relative scores. Depending on the application, the Fingerprint score analysis module 490; may select a single document with the highest overall score, or it may alternatively select all documents having an overall score higher than a given value. The matching document set can then be retrieved and printed out, electronically transmitted, displayed and/or stored, by one of the components of FIG. 1

I.a. Document Collection Pre-Processing

Figure 5:
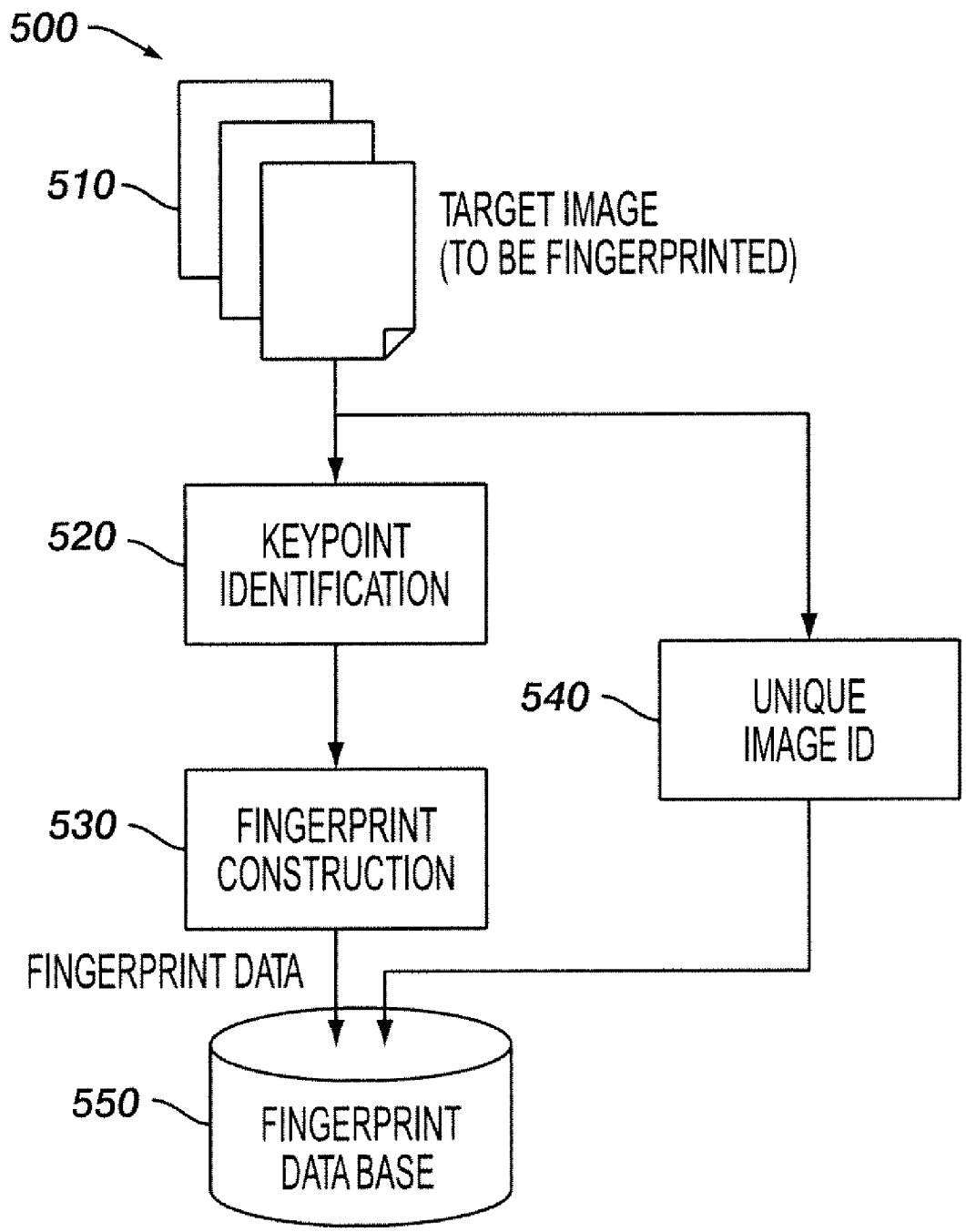
FIG. 5 is a method of generating a fingerprint data base for a document collection.

A document collection pre-processing flow diagram 500 is shown in FIG. 5. In this flow, target images 510 are processed sequentially, one at a time, to extract their visual fingerprint information based on keypoint identification.

In a keypoint identification processing module/step 520, each target image 510 is processed to identify a set of keypoints based on the input image content. The success of the method depends on its ability to find nearly the same keypoints in clean target images and in degraded versions of the images under certain common near-affine distortions and varying illumination conditions. The keypoint identification module 520 incorporates the following steps/modules, which will be expanded upon in the following pages. The modules/steps include a first adaptive thresholding module for converting the input image to binary. The binary output is processed by an estimate connected component module to automatically determine the average character height for the purpose of selecting an appropriate radial filter size to apply on the binary image. The resulting radial blur grayscale output is processed by a second adaptive threshold module and a list of connected components elements is generated, for which the centroid location of each connected component is calculated. Finally, a duplicate removal module removes any duplicate connected components having nearly the same centroid location. The resulting word centroids locations are selected as candidate image keypoints. The output of the keypoint identification module 520 is a list of keypoints and their locations on the page.

Next, in fingerprint construction processing step 530, fingerprints are calculated from small groups of keypoints in local neighborhoods. The use of localized fingerprints contributes greatly to the flexibility and robustness of the method, particularly in terms of relaxing the camera to image geometry and illumination considerations over small neighborhoods. The resulting fingerprints are stored in the Fingerprint Database 550 where each image will have a unique image ID 540 corresponding to the target images 510.

I.a.1 Detection of Document Keypoints

A goal of the keypoint identification module (e.g., 520 of FIG. 5) is to repeatedly and reliably find as many of the keypoints even in a degraded version of the image that is subject to at least one of, but not limited to noise, scene lighting variations, and affine transformations such as skew, warp, rotation, translation, scale, change of resolution, and the like.

Figure 6:
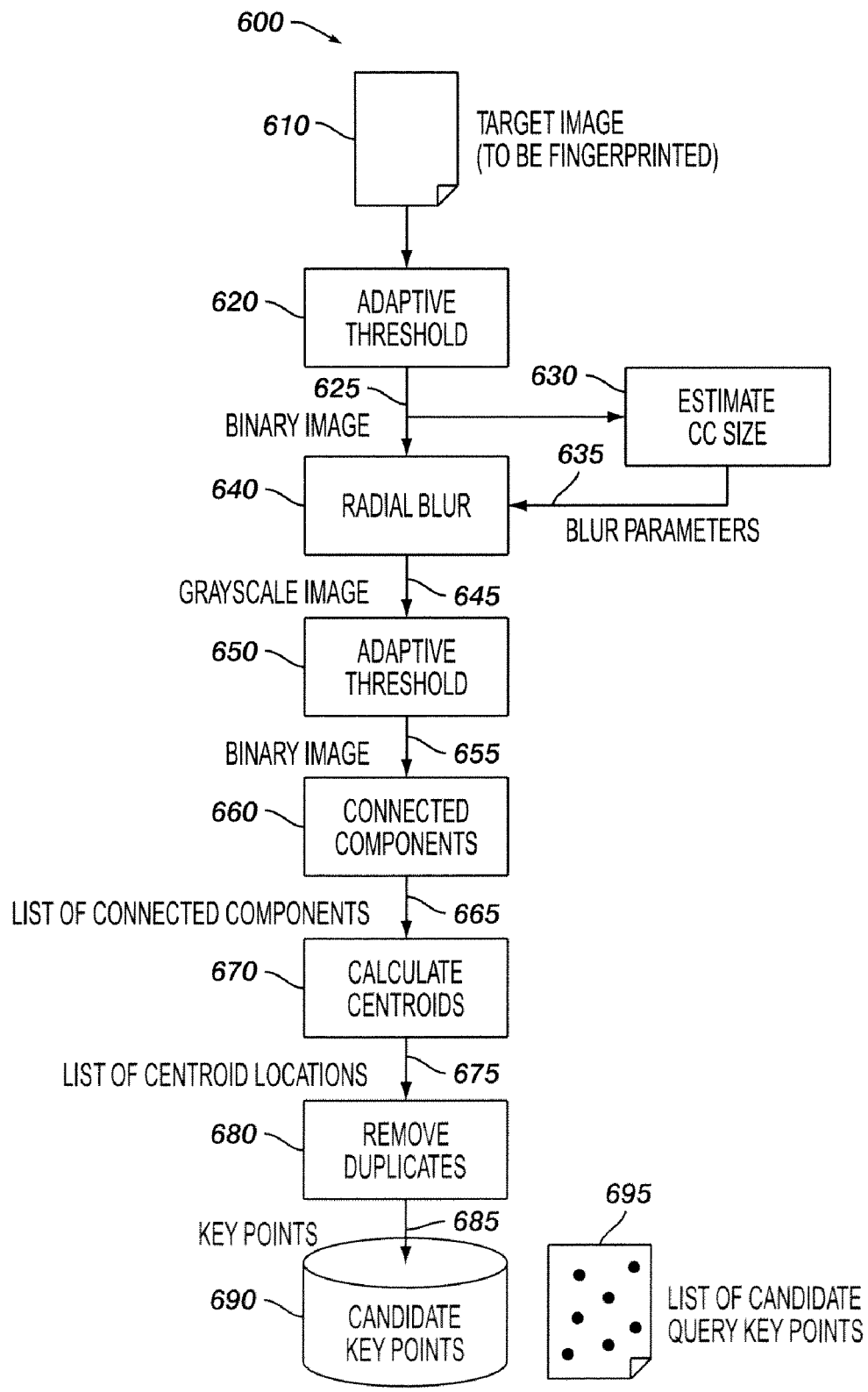
FIG. 6 is a method of identifying Candidate Keypoints in target documents.

A process of detecting document keypoint locations 600 of a target image 610 is shown in FIG. 6. Image processing of adaptive thresholding, blurring, and connected component collection are well known in the literature. For best results, it is desirable to perform the keypoint identification process in a perceptual image space in accordance with the properties of the human vision system.

A binary output image 625 of a first Adaptive Threshold module 620 is sent to an Estimate CC Size module 630. The term CC here stands for Connected Component, which is a maximally connected sub-group of binary pixels having the same polarity. Two pixels are in the same connected component if and only if there exists a path of the same polarity pixels between them. The purpose of the Estimate CC Size module 630 is to dynamically estimate, for the target image 610 on an image by image basis, the blur parameters 635 or blur filter size to be applied in the subsequent Radial Blur module 640. The objective of the blurring process is to provide robust, reliable, and repeatable keypoint identification. The blurring also helps to remove noise such salt and pepper noise and eliminate small isolated features on the page. The shape of the blurring filter, for example but not limited to an approximated Gaussian shape, should be smooth enough to prevent from introducing undesirable artifacts.

One issue in determining the right amount of blurring is that the size of a typical text character on the input page is not known in advance. One embodiment of the present application discloses the Radial Blur parameters 635 fixed and predetermined in advance to provide a good compromise across a range of standard type formats such as for 10 to 14 point Roman fonts. In a second embodiment of the present application, the Radial Blur parameters 635 are made selectable such that the user may specify the optimum setting to apply on a document by document basis. In either one of these embodiments, the Estimate CC module 630 is not used, and its output is replaced by the selected predefined Radial Blur parameters 635.

In a third embodiment of the present application, the Estimate CC module 630 is used to automatically estimate the optimum Radial Blur parameters by examining the Input target image 610 content. In this case, the Estimate CC module 630 uses the binary output from the Adaptive Threshold 620 module. The Estimate CC module 630 processes the binary image 625 to gather connected-component elements, and proceeds to histogram the connected-component height, because character height is less variable and more indicative of the font size than character width in most Roman languages. The height histogram is used to determine the appropriate Radial Blur parameters based on the frequency of occurrence. During the process, the Estimate CC module 630 takes care to eliminate noise-induced connected-components such as when the dimensions are too small when comprised of a few isolated pixels, or the dimensions are too large when a line or frame is encountered around the page, so that the estimate provided is not biased by a few unusually large or unusually small connected component elements. In addition, since pages may contain a mixed assortment of font sizes, the Estimate CC algorithm has been designed to provide a conservative estimate with good compromise even in the case of a mixed font set.

In a fourth embodiment of the present application, the Estimate CC Size module 630 may dynamically provide adaptable blurring parameters based on analyzing the Input image content in localized sub-image regions and adaptively varying the blurring parameters from one region to the next; For example, when dynamically moving from one image area containing primarily small point text to another nearby area containing larger fonts.

The output of the Radial Blurring module 640 is a grayscale image 645. The Adaptive Threshold module 650 converts the grayscale Radial Blur 640 image output 645 to binary black and white output 655 by adaptive thresholding 650.

The binary output of the second Adaptive Threshold module 650 is a binary image 655 and is forwarded to the Connected Component module 660. Connected component methods are well known in the art, and may be considered a set of maximally connected components of a graph.

In a first embodiment of the present application, all the available connected components are used. In a second embodiment, the available connected components are sorted by relative strength, for example, giving weight to optimum of the connected component dimensions, pixel count, aspect ratio, and/or proximity to other connected components, and only the smaller subset of connected components are outputted. In a third embodiment, the input target image 610 may be sub-divided into a set of overlapping or non-overlapping regions, and a number of connected components selected from each region to prevent one region from dominating all others.

The Calculate Centroid module 670 determines the visual center of each connected component at the output of the Connected Component module 660. For each connected component, the horizontal centroid location is calculated by summing together the horizontal coordinates of each member pixel of the connected component and dividing the outcome by the total number of member pixels. The vertical centroid location is likewise calculated by summing together the vertical coordinates of each member pixel and dividing by the number of member pixels. The summation can be effectively done on-the-fly during the connected component analysis. Note that only the pixel members of a given connected component contribute to its centroid location, ignoring any other non-member pixel "holes". The visual centroid of each connected component is calculated with subpixel precision, since in many languages the connected components tend to be situated in text lines.

In the last processing step of the keypoint identification phase, the list of connected component centroid locations 675 from the Calculate Centroid module 670 is validated by the Remove Duplicates module 680, which produces a list of keypoints 685. The purpose of the validation is to ensure that no two connected component shall have the same centroid locations within a given tolerance level. Duplicated connected components with nearly the same centroid locations are eliminated.

The list of remaining connected component centroids at the output of the Remove Duplicates module 680 becomes the final candidate query keypoints list 695. The overall number of candidate keypoints 690 depends on the Input image content and the type of connected component processing. There can be several hundred keypoints for a typical machine printed page.

Figure 7A:
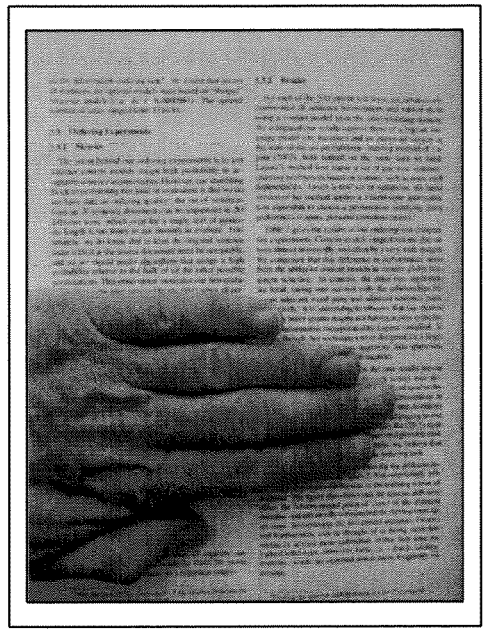
FIGS. 7A-7D are an illustration of the Key Image Processing during image query.
Figure 7B:
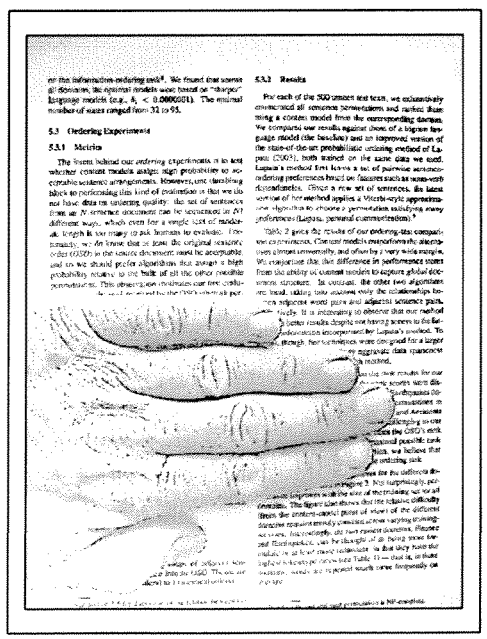
Figure 7C:
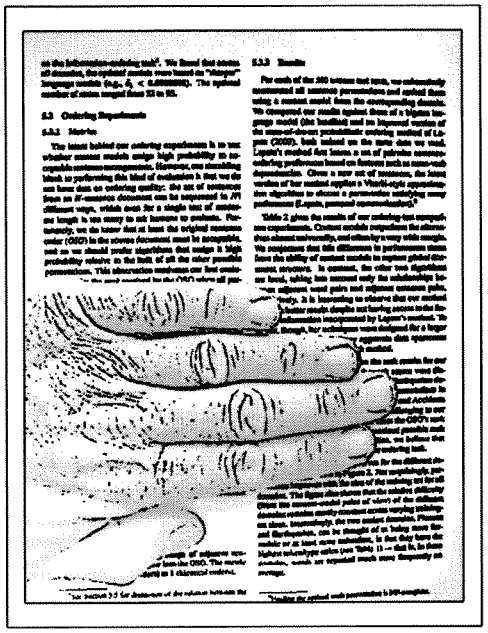
Figure 7D:
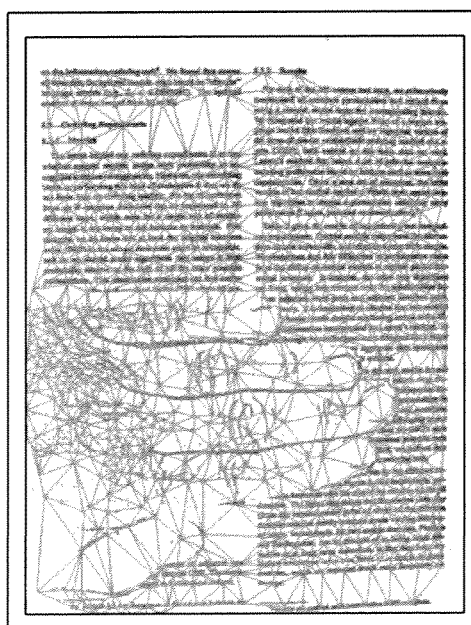

FIGS. 7A-7D illustrate an example of an input query image that has been processed in accordance with the above description. FIG. 7A shows one example of the input image 610 of FIG. 6. FIG. 7B shows a typical output after preparation of the first Adaptive Threshold module 620 of FIG. 6. FIG. 7C shows the blurred output after operation of the second Adaptive Threshold module 650 of FIG. 6. FIG. 7D shows the locations of the resulting connected component centroids as graph nodes.

Figures 8A, 8B:
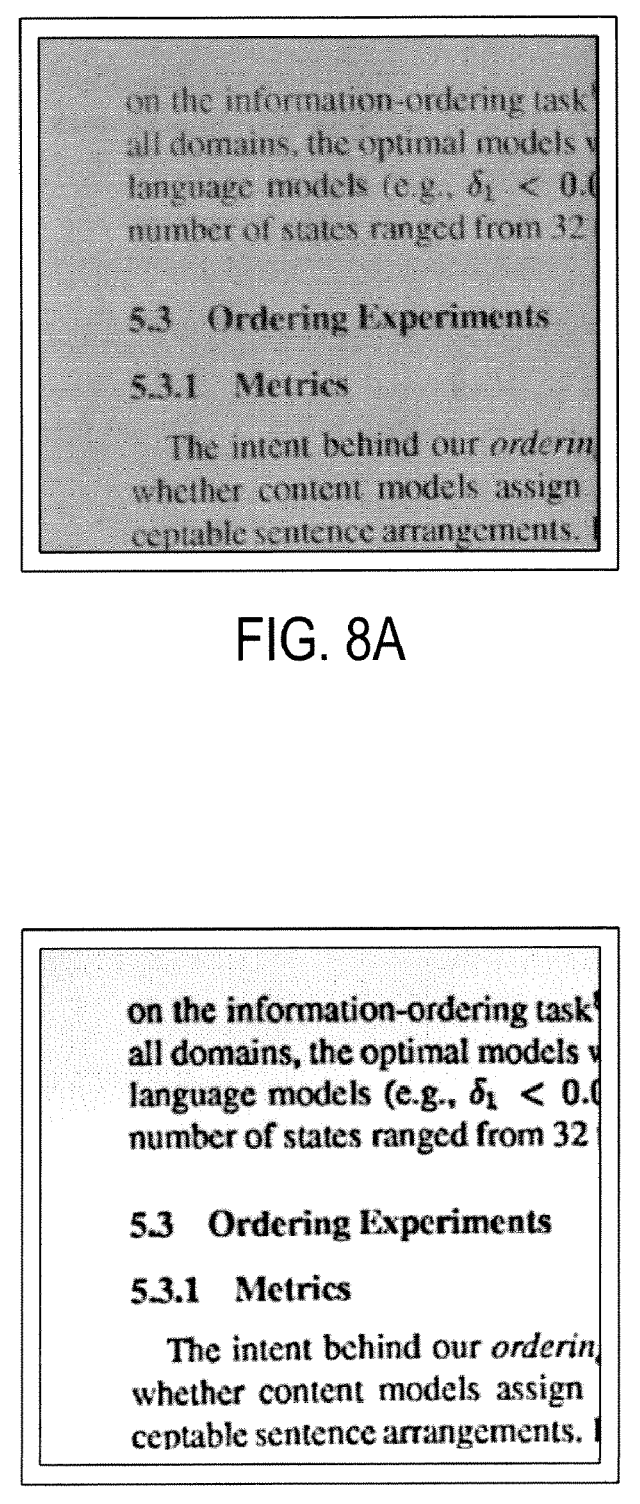
Figures 8C, 8D:
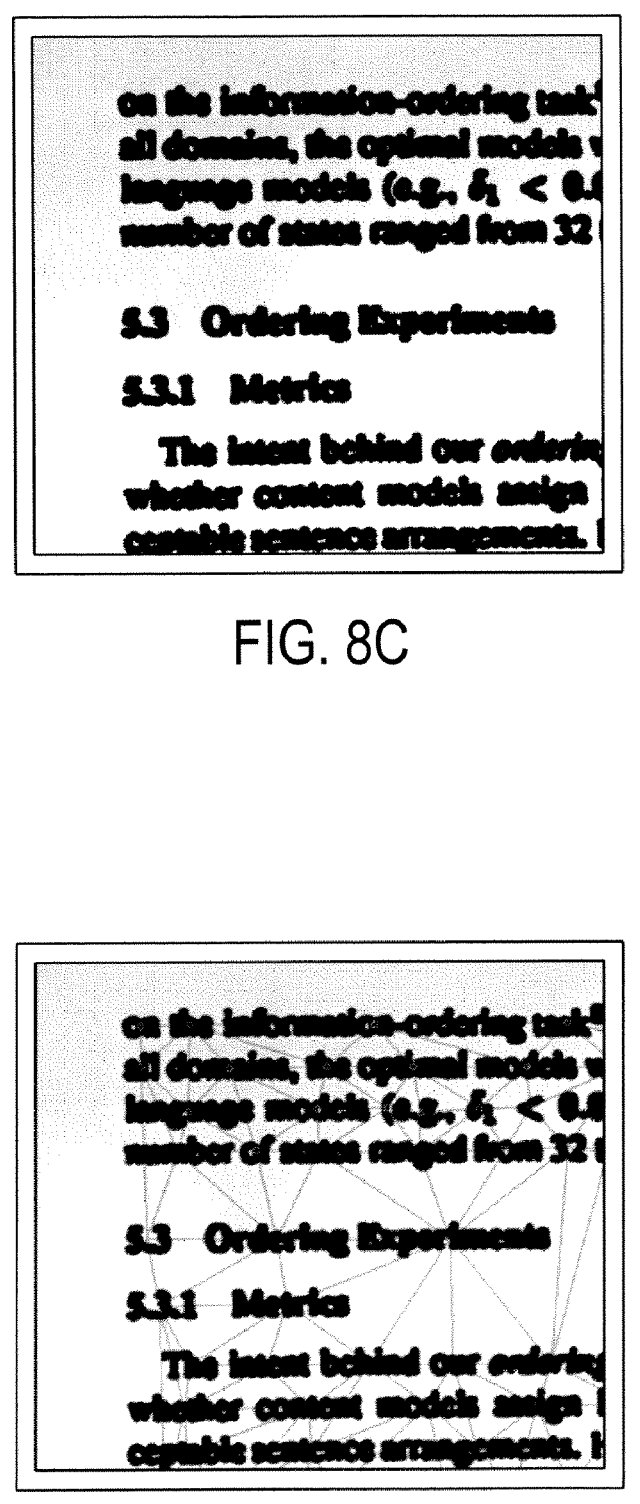

FIGS. 8A-8D illustrate an example of an input query image that has been processed in accordance with the above description. FIG. 8A provides a magnified view of image processing for an area of the image of FIG. 7A. FIG. 8B shows a magnified view of the output after operation of the first adaptive threshold 620 and FIG. 8C shows a magnified view of the blurred output after operation of the second Adaptive Threshold module 650. By comparing FIGS. 8B and 8C, the meaning of characters being "connected" to form words can be appreciated, whereby the individual characters in the example of FIG. 8B becomes connected in FIG. 8C after blurring to form roughly a single connected component per word or phrase. FIG. 8D illustrates the connected component centroid locations as superimposed graph nodes.

I.a.2. Construction of Fingerprints

This section describes the process of computing fingerprints from local groups of keypoints and packing the fingerprints for efficient storage in a Fingerprint Database (e.g., 350 of FIGS. 3A, 3B). The fingerprints are packed to reduce the Fingerprint Database size and storage requirements.

We seek to identify robust 2D visual fingerprints in the input image that will be stable across a wide range of noise, viewing conditions, and image distortions. In addition, fingerprint size can be minimized in order to enable the system to effectively scale up to handle very large document collection sizes such as a collection containing millions or billions of documents. Since the fingerprint database consists of all the valid fingerprints in the collection. At the same time, the fingerprints are expected to identify the individual content they represent with high accuracy and confidence.

Fingerprints are constructed as sequences of quantized, transformation-invariant 2D ratios, called persistent ratios, which are derived from the relative 2D positions of a given keypoint and its (N−1) nearest-neighbor keypoints. Thus each fingerprint is localized to a small image neighborhood around the keypoint of interest. A fingerprint sequence is dependent only on the relative 2D geometry between the keypoint of interest and its (N−1) closest keypoint neighbors. The number of neighbors N is a design parameter that influences the fingerprint strength.

An aspect of the present application lies in making the fingerprints robust to certain image distortions such as, but not limited to skew, warp, rotation, translation, scale, change of resolution, and the like, that commonly occur during the process of scanning or taking a picture of the image with a digital or a cell phone camera.

Figure 9A:
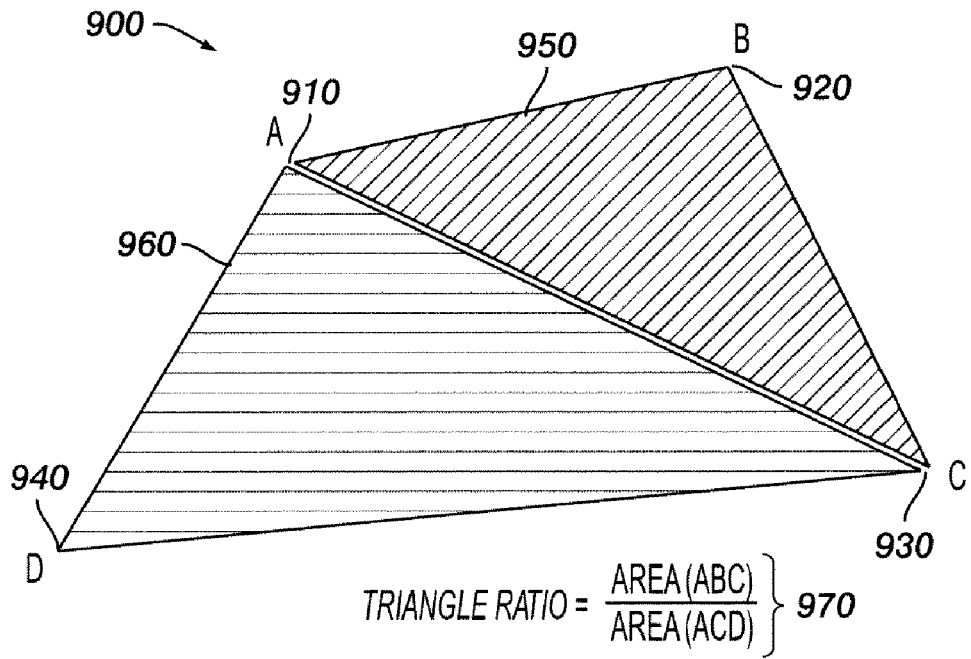
FIG. 9A illustrates the method of obtaining a Triangle Ratio for construction of Fingerprints.

As illustrated in FIG. 9A, it is well known in the art that for any given polygram 900 comprised of four non co-linear points {A, B, C, D} (i.e., 910, 920, 930, 940), on the object surface, comprising a triangle ABC 950 and a second triangle ACD 960, the ratio of triangle areas (ABC/ACD) 970 remains constant under any affine transformation. Hence only P=4 points are needed to calculate one triangle area ratio, illustrated as the Triangle Ratio 970. This affine transformation has been shown to provide an acceptable model for describing the camera to planar object geometry in many practical situations.

In another embodiment of the present application, for situations where a transformation order larger than affine is required to describe the image model, the transformation can be extended to handle perspective transformation using P=5 points (instead of 4) to calculate a single persistent ratio which is the product of two triangle ratios.

Figure 9B:
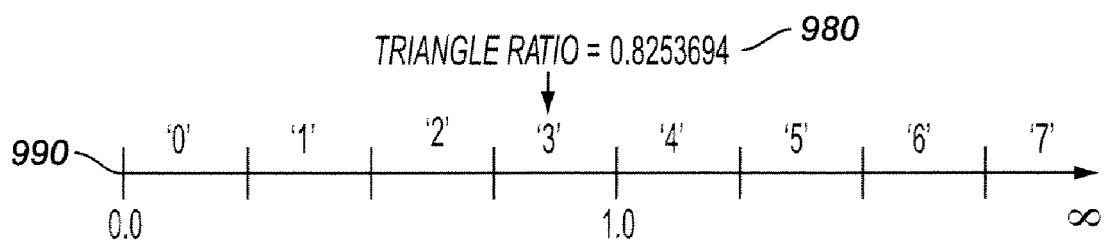
FIG. 9B is the Quantization of the Triangle Ratio of FIG. 9A

A single fingerprint is therefore comprised of a sequence of quantized persistent transformation ratios for a group of N nearest neighbor keypoints sorted in clockwise order. To keep the fingerprint size small, the transformation ratio is quantized to Q-levels 980. In one embodiment, the value of Q can be conveniently chosen to be a binary power of two. In FIG. 9B, the quantization process is illustrated as the Quantization of the Triangle Ratio 970 of FIG. 9A for the case of Q=8. The valid range (0, ∞) of a Triangle Ratio before quantization is divided into Q=8 intervals labeled '0' to '7' as shown in FIG. 9B (990). The interval boundaries are determined empirically to provide approximately uniform distribution of quantization labels over a large set of representative documents. The incoming triangle ratio value 980 is sequentially compared with increasing interval boundaries to determine the first higher or equal interval boundary, upon which the process is terminated and the corresponding label interval is assigned as the quantized result. For example, an incoming triangle ratio of 0.8253694, being less than 1.0 and higher than the previous interval boundary, is assigned a quantized value of '3'.

Figure 10A:
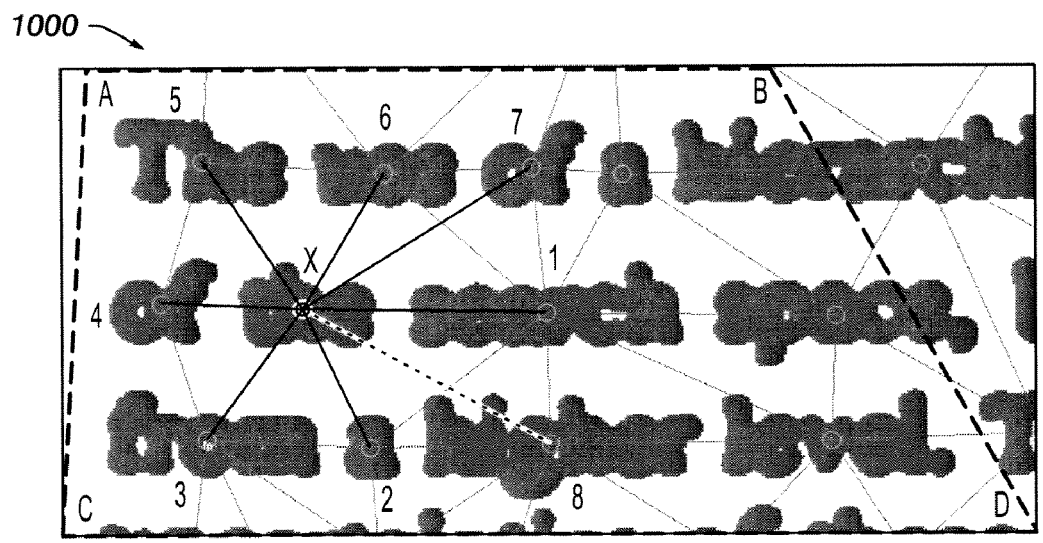
FIG. 10A is an originally captured image
Figure 10B:
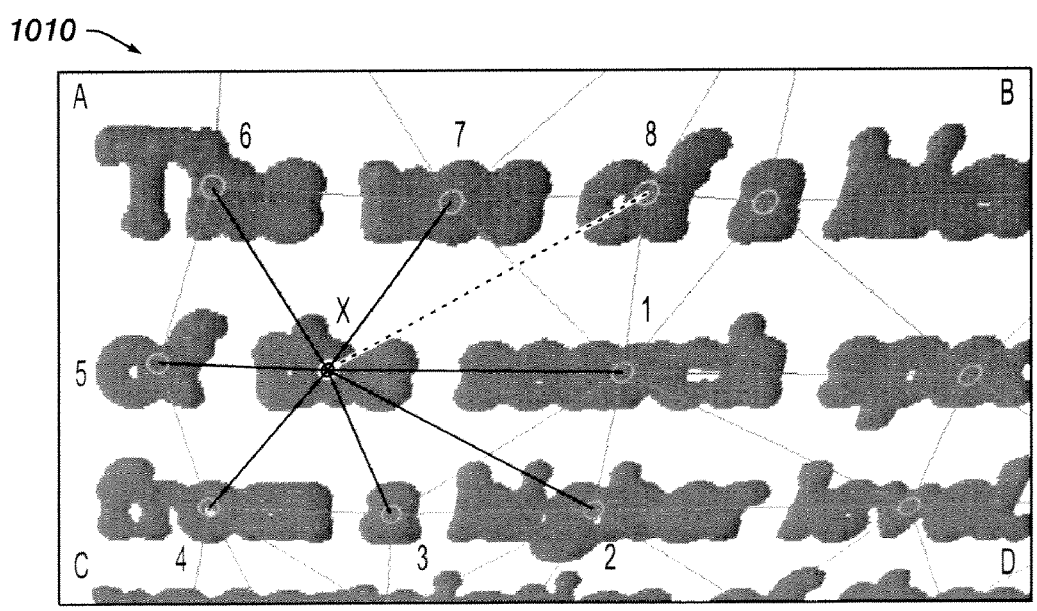
FIG. 10B shows a perspective transformation of FIG. 10A.

As illustrated in FIGS. 10A-10B, one potential issue in using the nearest neighbor method is that nearness is not necessarily preserved under perspective transformation. FIGS. 10A-10B provide an example to illustrate the case in point. FIG. 10A depicts an originally captured query image 1000 FIG. 10B shows an example of a perspective transformation 1010 of the image 1000 in FIG. 10A, where the designator points A, B, C, D in FIG. 10A have been mapped to the four corners of FIG. 10B. The dotted line in FIG. 10A encloses the portion of the image being transformed to fill the entire FIG. 10B area. The eight nearest neighbor points to point X are sorted in clockwise order (i.e., as 1-8), independently in both FIG. 10A and 10B, starting from horizontal line to the right. In this example, a point 8 the farthest away from point X in FIG. 10A has became the point 2 in FIG. 10B after transformation. Therefore there can be no guarantee that the N nearest neighbors of a given keypoint will remain exactly the same N keypoints under arbitrary affine or perspective transformation. Still, the closest keypoints are more likely to remain in the list of N nearest neighbors than keypoints that are farther away.

To overcome the above issue, the present application proposes to allow one or more of the neighbor keypoints to be missing in order to further increase the robustness of a fingerprint to affine or perspective transformation. Under one embodiment of the present application, one keypoint is allowed to be excluded under the consideration of limited affine distortions in small localized neighborhoods. Thus each given keypoint gives rise to a number of fingerprints N, by leaving out one keypoint at a time. Each fingerprint is created by systematically walking a remaining number of keypoints, N−1, in radial order of orientation, and recording the sequence of quantized persistent ratios for all the possible combinations of P points (P=4 for affine, P=5 for perspective transformation). FIG. 11 illustrates an example of the fingerprint output for a single page in the case of N=8, P=4, and Q=8. Each keypoint gives rise to a plurality of fingerprint sequences. In one situation the plurality of fingerprint sequences may be eight fingerprint sequences of a length of 35.

Figure 12:
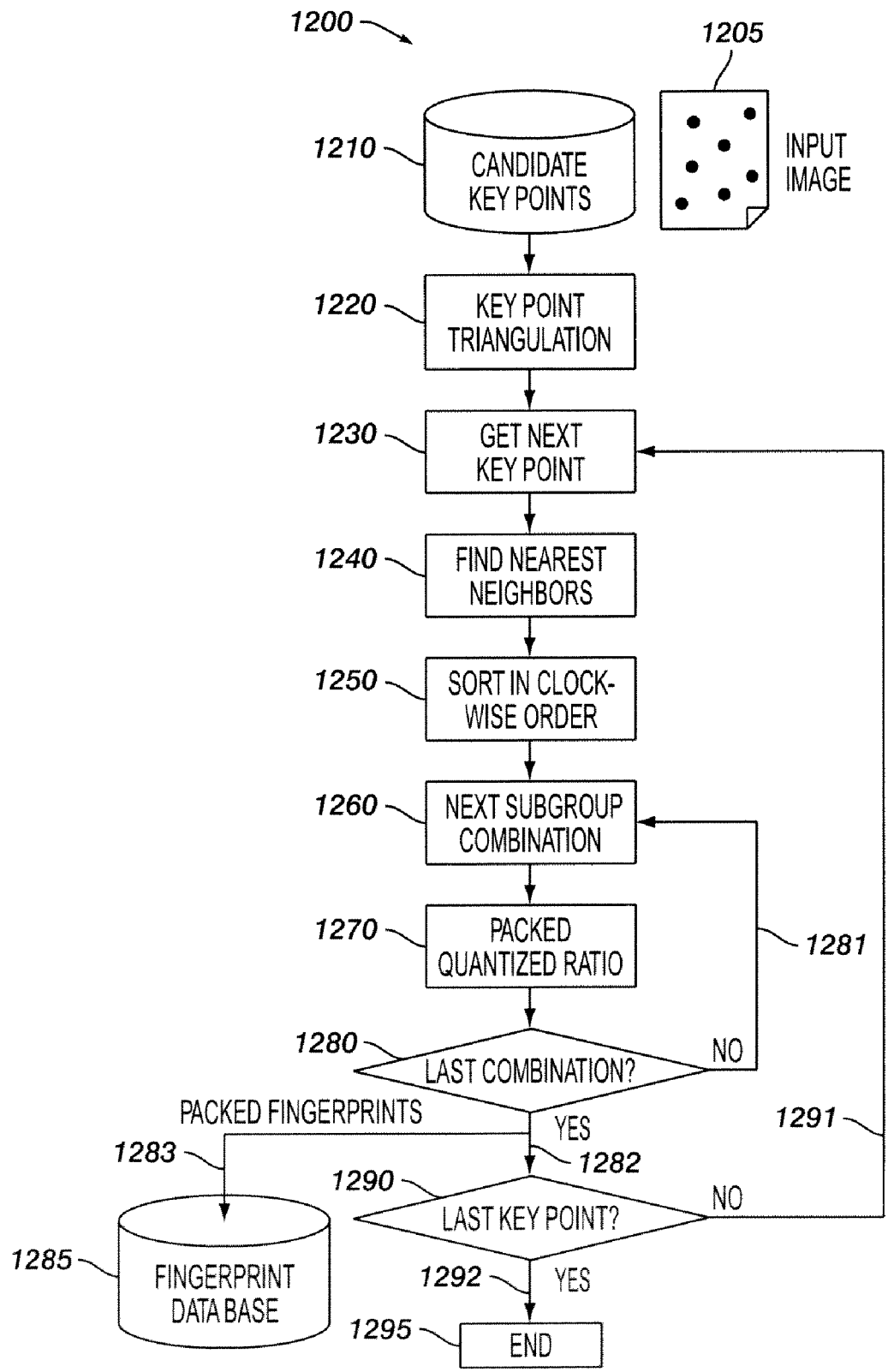
FIG. 12 is a method of Generating a Packed Fingerprint Database from Keypoints.

A Fingerprinting process 1200 is shown in detail in FIG. 12. The input to Fingerprinting process 1200 is the list of candidate keypoints 1210 for the input image 1205. The first Fingerprinting processing step in FIG. 12 is the Keypoint Triangulation module 1220. In this embodiment Delaunay or Keypoint Triangulation 1220 are used to identify the nearest keypoints to each given keypoint in a local neighborhood. The triangulation outcome has been illustrated in FIGS. 7D and 8D (line links connecting connected component centroids). By following the triangulation links, the nearest (N−1) neighbors to any given keypoint can be effectively determined.

Each candidate keypoint and its (N−1) nearest neighbors is considered as a fingerprint candidate. Each current candidate keypoint Kp is selected sequentially from the input list 1210 by the Get Next Keypoint module 1230. For each keypoint Kp, the Find Nearest Neighbors module 1240 identifies the (N−1) nearest keypoints with the closest distance to the given keypoint Kp, where N is a given parameter. The Find Nearest Neighbors module uses the Delaunay or Keypoint Triangulation result 1220 to return a list of the closest keypoints to Kp, sorted by increasing distance from Kp. The first element of the returned list is always the current keypoint Kp (with a distance of zero). The value of the parameter N is adjusted to provide a reasonable tradeoff between the fingerprint "strength" or distinctiveness, the overall system performance, quantified as the number of computations per fingerprint, and the resulting database size or fingerprint size. In this example the values, N=8, 12, or 16 are used.

The points of the Find Nearest Neighbor module 1240 need to be taken in a consistent order so that sequence of area ratios will be consistent for the same keypoint/neighborhood between database and query images. The Sort in Clockwise Order module 1250 sorts the list of N nearest neighbor keypoints of a given keypoint in increasing clockwise orientation.

The Sort in Clockwise Order module 1250 includes a method and system to stabilize keypoint ordering with respect to the common case of nearly co-linear keypoints. The Sort in Clockwise Order module 1250 uses the first M nearest neighbors, where M<N, on the list (the closest to the given keypoint) to calculate a subgroup center of origin. The farthest (N−M) keypoints are not used in calculation of the subgroup center of origin, in order to ensure that origin will remain stable under affine or perspective transformation. In the present implementation the Sort in Clockwise Order module 1250 uses the average location of M=5, when total N=8, nearest neighbor keypoints as the center of origin for the purpose of determining keypoint ordering.

After determining the origin center of the current neighbor keypoint cluster, the Sort in Clockwise Order module 1250 proceeds to sort the keypoints in increasing clockwise orientation order. The sorting is done on both the orientation and distance. The order is by increasing clockwise orientation order. However, if two or more points have roughly the same orientation, where the difference is within a predefined tolerance level, the points are sub-ordered by increasing distance for all the points of a substantially similar orientation.

For each unique subset of N keypoints, the Next Subgroup Combination module 1260 systematically and methodically selects the next subgroup combination of P=4 or P=5 keypoints depending on affine or perspective transformation case. For example, for N=8 there are 70 unique combinations of P=4 keypoint subgroups.

For each Next Subgroup Combination of P=4 keypoints, the Packed Quantized Ratio module 1270 calculates a single persistent ratio and quantizes it using a set of predefined interval boundary thresholds. The number of quantization levels Q is a design parameter. In these examples, Q=8 or Q=16 are used. The quantization threshold values are determined empirically by studying the distribution of persistent ratios in a large collection of documents of a particular type.

In order to further reduce the size of the Fingerprint Database 1285, the Packed Quantized Ratio module 1270 packs a number of the resulting quantized persistent ratios into one machine word. For example, with N=8, P=4, and Q=8, the entire fingerprint sequence of 70 subgroup combinations can be tightly packed into less than four 64-bit words. In one embodiment of the present application, the size of a packed fingerprint occupies a total of three 64-bit words and three 8-bit bytes with no need to split partial information across multiple words or bytes.

The process of calculating and packing the fingerprints continues sequentially, one persistent ratio at a time, until the last combination is detected by the Last Combination module 1280. If the current P subgroup combination is not yet the last combination 1281, the Last Combination module 1280 routes the flow back to the Next Subgroup Combination module 1260, to obtain the next P subgroup and proceed to calculate its quantized persistent ratio and pack it. This process continues until the last P subgroup combination has been processed 1282. At this time, the resulting packed fingerprint data 1283 is written to the Fingerprint Database 1285. Note that the fingerprint data can be written to the Fingerprint Database 1285 sequentially, one fingerprint at a time, as each packed fingerprint data is becoming available.

Finally, the process of writing the fingerprints continues sequentially for all the remaining keypoints, until the last keypoint is detected by the Last Keypoint module 1290. If the current keypoint combination is not yet the last keypoint 1291, the Last Keypoint module 1290 routes the flow back to the Get Next Keypoint module 1230, to obtain the next keypoint and proceed to repeat the process to calculate its packed fingerprint and adding it to the Fingerprint Database 1285. The Fingerprinting process continues in this manner until the last keypoint combination last corresponding fingerprint has been processed 1292 and added to the Fingerprint Database 1285. Once the last keypoint has been addressed, the process ends 1295.

Figure 13A:
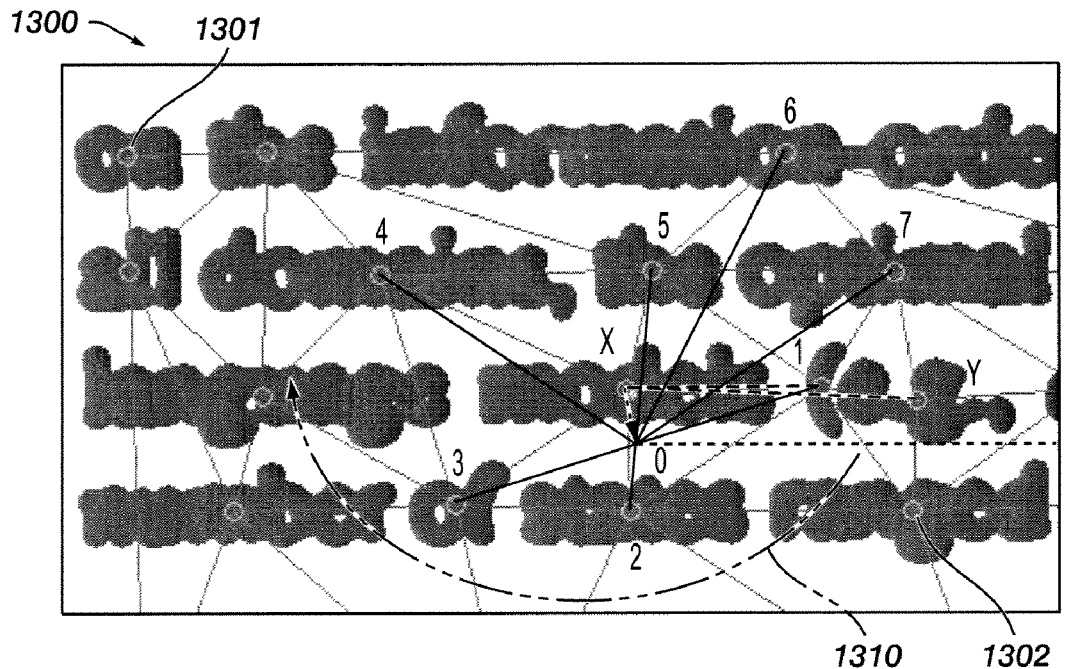
FIGS. 13A-13B illustrate a method of Sorting of Nearest Neighbor Keypoints in Clockwise orientation order.
Figure 13B:
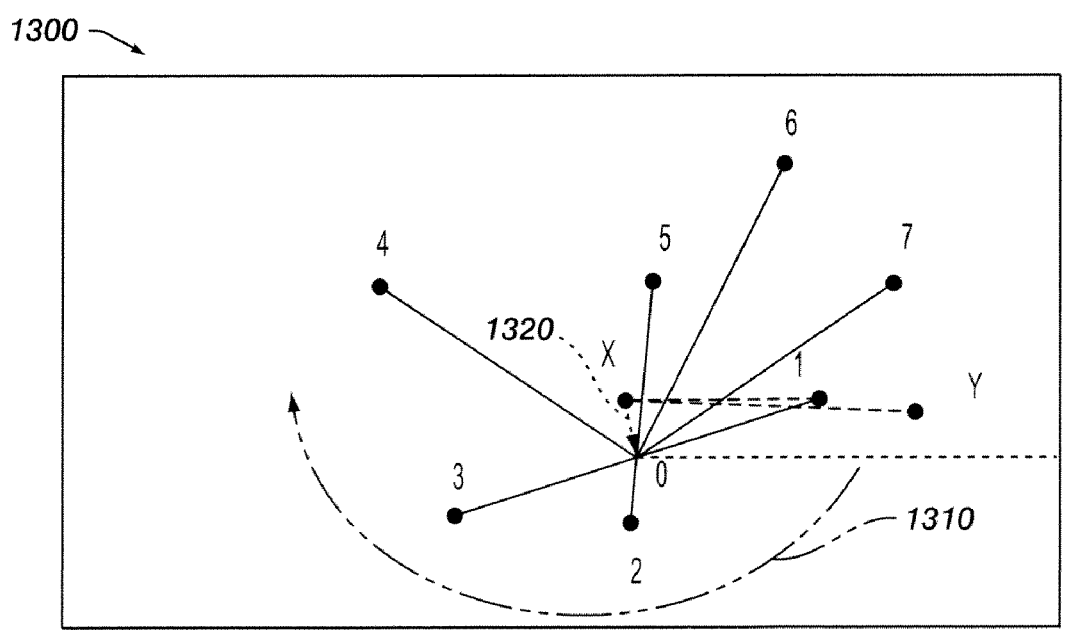

A method of calculating the fingerprint center of origin is illustrated in FIGS. 13A-13B. FIG. 13A illustrates the process with respect to a given example image 1300. The processed image is shown with the keypoints or word centroids identified by circles such as circles 1301-1302. These are set forth only as examples, and the other circles in the figures are also word centroids. For example, numbers (1-7) also represent word centroids which are near neighbor keypoints to point X. FIG. 13B (1370) eliminates the background processed image for better clarity, but is otherwise the same as in FIG. 13A. In this example, a fingerprint is computed for the keypoint X, using seven additional keypoints (1-7) in the local neighborhood. In the first step, the center of origin for this fingerprint is calculated using the closest M=5 keypoints to keypoint X, that is, the average location of the points {X, 1, 2, 3 and 5}. This is likely to move the center of origin away from the point X, and away from the co-linear line of keypoint along the text line Y which includes the keypoint X, to a new center of origin following arrow line 1320 to point 0. The three most distant keypoints (4, 6, 7) of the seven (1-7) are not used for the center of origin calculation to stabilize the point 0 location by allowing for up to three (3) points to be shifted by arbitrary affine or perspective transformation. In the second step, the entire set of eight keypoints (X and 1-7) are sorted in clockwise order 1320 with respect to the newly calculated sub-group center of origin (0), resulting in the final output sequence ordering of (1, X, 2, 3, 4, 5, 6, 7) in this case. With attention to the ordering of keypoints, it is to be understood the above-described ordering depends on the point of reference. If "0" is used as the point of reference, the resulting sequence would have been 234X5671 since 1 is above the dotted line from "0". The alternative as used here is to continue to use X as reference, but pretend the keypoint mass is moved to "0", which yields the listed sequence. In the foregoing, the latter has been used, since it keeps the original keypoint location as reference, while the point "0" may move around X and cause the flipping of keypoint sequence order. However, it can be done either way, as what needs to be accomplished, in either case, is to be able to repeat the same sequence in both target and query image. Note that the objective of the second step is to sort in clockwise order, not by distance.

Once the ordering of N nearest neighbor keypoints has been established for a given keypoint, a fingerprint can be generated. Fingerprints are formed from successive subsets of size P=4 of the keypoints in a neighborhood by excluding one or more keypoints at a time and constructing a sequence of the remaining subgroup combinations of non-excluded keypoints. Thus a group of fingerprints can be effectively constructed from the packed sequence of subgroup combinations. P-subsets of the N keypoints are considered in a systematic and consistent manner. For each, an integer is determined by computing the persistent area ratio for that P-subset, and mapping the area ratio to an integer as described herein. The length of a fingerprint for the given keypoint is the total number of such P-subsets. This is determined by the number of combinations for choosing unique P keypoints out of N keypoints. For example, if N=8 and P=4, the number of possible subgroup combinations is 70 persistent ratios. Of these, 8 fingerprints of length 35 subgroup combinations each can be constructed, for example, by excluding one keypoint at a time.

I.b. Preparing Fingerprints Information for Fast Matching

Figure 14:
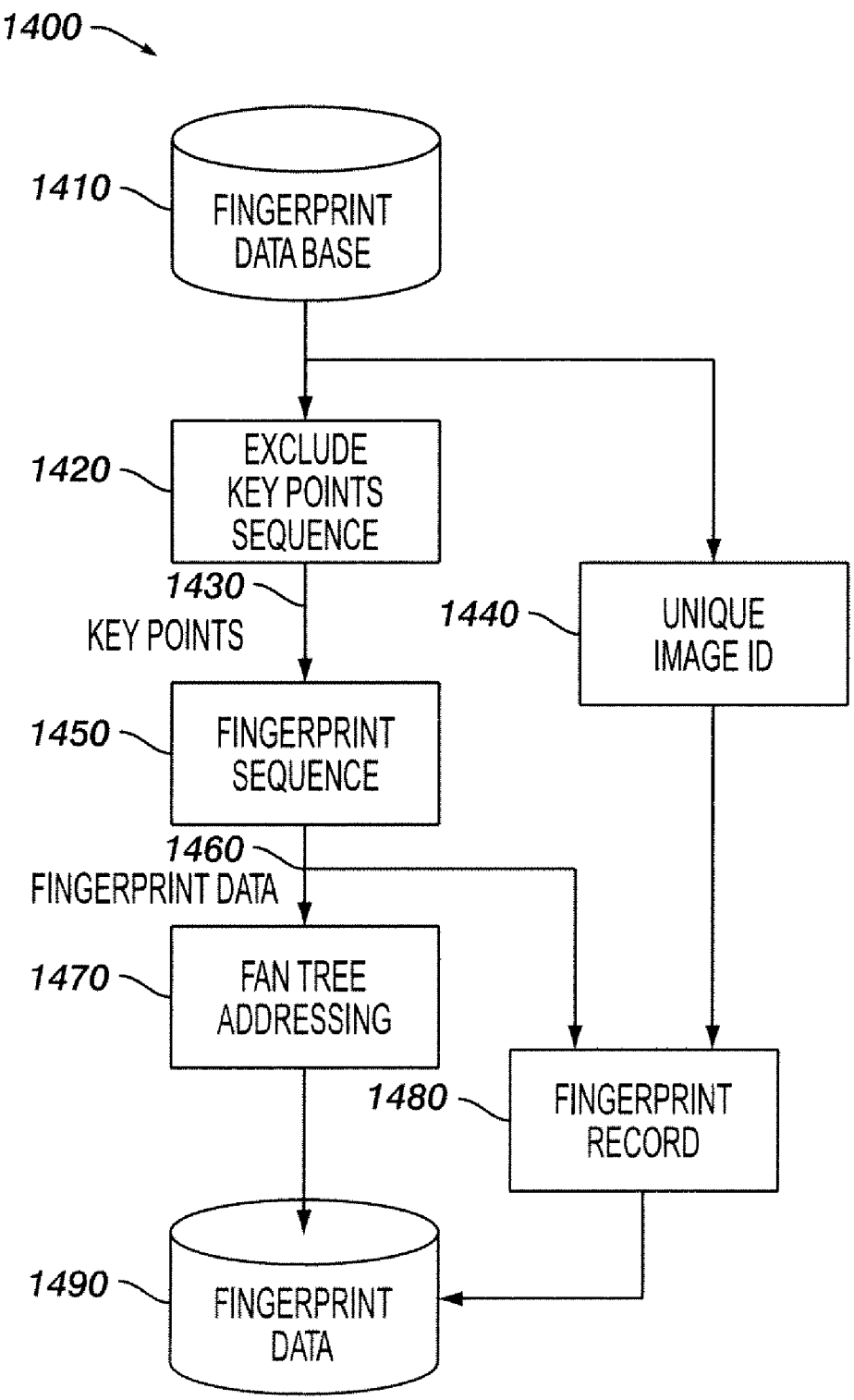
FIG. 14 is a method of building a Fan Tree from the Fingerprint database.

As illustrated in FIG. 14, since the fingerprints in the Fingerprint Database 1410 are stored in a packed format to reduce the memory size and loading time, they must first be unpacked and re-organized in a unique manner in accordance with the Fan Tree data structure to facilitate efficient fingerprint matching. Note that it is only necessary to prepare the Fingerprint Database once, upon the first image query. The Fan Tree data structure (containing the unpacked fingerprint sequences) can be kept in memory and subsequently reused with any number of image queries.

The method of preparation of the packed fingerprint database 1410 has previously been illustrated in FIG. 12. The fingerprint information is retrieved the from the fingerprint database 1410. Each fingerprint database entry gives rise to multiple candidate fingerprints.

The Exclude Keypoint module 1420 selects multiple candidate fingerprint keypoint combinations by excluding one or more of the fingerprint keypoints 1430. This allows for one or more missing keypoints among the local neighborhood keypoints. In the present implementation, the Exclude Keypoint module leaves out one keypoint. With a local neighborhood of N keypoints, this gives rise to N fingerprints for each database entry, or N fingerprints per keypoint since a database entry is made for each keypoint.

The Fingerprint Sequence module 1450 generates the sequence of N candidate fingerprints for each keypoint. For example, when N=8, the Exclude Keypoint module 1420 will cause the first fingerprint to be generated by leaving out the first keypoint and selecting the seven remaining keypoints. After that, the Exclude Keypoint module will leave out the second keypoint and select the first and six last keypoints for creating the second fingerprint. This process continues until all excluded keypoint combinations have been encountered. In this example each database entry will generate 8 candidate fingerprints, each of length 7 choose 4=35.

With N=8 and P=4, there are (8 choose 4)=70 unique combinations of 4 keypoint subgroups. This is what gets stored in the database 1410 in a packed format for each keypoint.

Next fingerprints for the case of a single missing keypoint are generated. However, which keypoint may be missing is not known in advance, so preparation for all possibilities is undertaken. With N=8, there are 8 possible ways of a single missing keypoint: either the first, or the second, or third, etc. —for a total of 8 cases. A different fingerprint for each one of these cases is computed. Each fingerprint in this case is only based on 7 keypoints (because one of the original 8 is missing). Thus the length of each fingerprint in this case is (7 choose 4)=35, and there are 8 of them total. This means that each fingerprint is comprised of a sequence of 35 integers (quantized ratios) in the range 0-7. The 8 fingerprints are added to the Fan Tree data.

At query time, 8 keypoints (current and 7 closest) are generated, and again 8 query fingerprints are computed using the same method, and likewise excluding one keypoint at a time. Then an attempt is made to match the keypoints against the Fan Tree content. Matching is stopped upon the first obtained match. If a single keypoint is missing from the query image (it does not matter which), one of the query fingerprints out of the 8 is bound to have a match (to the one with the 7 other keypoints present). And if no keypoint is missing (all 8 present), then there would be 8 matches (because any group of 7 will match), except the process stops after the first positive match since there is no need to continue checking. If, however, two keypoints or more are missing at the same time, there would be no match for this location. If so desired, the system could easily handle more missing keypoints by extending the method to allow more missing keypoints (e.g., 2 out of 8, etc.).

The Fingerprint Data 1460 output from the Fingerprint Sequence module 1450, together with the unique image ID 1440 that is retrieved from the database for the current image, form a fingerprint record 1480. The fingerprint record 1480 is stored in a corresponding Fan Tree Leaf node location which is addressed by the Fan Tree module 1470. The Fan Tree Leaf node information is stored as a linked list of fingerprint records 1480 in the corresponding Fingerprint Data structure 1490. Only the actual Fan Tree Leaf nodes corresponding to real fingerprints are populated. The first fingerprint to arrive at a particular leaf node populates that leaf node for the first time. If more than one fingerprint happens to arrive at the same leaf node again (i.e., following the same Fan Tree path), the new fingerprint information is added at the same leaf node by linking the new fingerprint information with the last previous fingerprint information on that leaf node.

I.b.1. Fingerprint Permutations

This section describes a method and system that is useful for substantially reducing the overall number of candidate fingerprints to be matched for each query fingerprint, thereby leading to a significant performance boost.

One problem that may occur during the fingerprint matching is that the query image may be in a different orientation relative to the target image to be matched. When the query image is rotated relative to the target image, the resulting fingerprint sequence is unlikely to match the target sequence due to the different order of digits within the sequence, even though the two fingerprints share an identical set of digits. Two fingerprints will only match if there is a one-to-one match between each and every corresponding quantized ratio digits of the entire fingerprint sequence.

The particular sequence of quantized ratios of a given fingerprint depends on the particular ordering of its keypoint. For example, if the query image is rotated relative to the reference original, the starting keypoint may be different, leading to an entirely different sequence of quantized ratios. In order to determine a possible fingerprint match, the two fingerprints must first be put into the same sequence order of corresponding keypoints.

One approach to overcome the above problem is to generate all the possible fingerprint sequences that may potentially occur as a result of image rotation and register them in the Fan Tree as possible candidate fingerprints to match against. However, this approach is both inefficient, in having to check for multiple matches, and wasteful in having to store multiple versions of each candidate fingerprint in memory.

In the present application, propose is a novel approach to generate additional fingerprints by taking different permutations of the basic fingerprints that are likely to be found in a query image because of uncertainty in the sequencing order. The use of permutations greatly reduces the number of candidate fingerprints to be matched.

The target keypoints are first circularly sorted by order of increasing orientation. If two or more keypoints are found to have a substantially similar orientation within a pre-specified tolerance of each other, they are further sorted by increasing distance from the center of origin as the secondary sorting criteria within the group. While the sorting process above is useful to eliminate many possible candidate keypoint combinations, it is not possible to determine in advance the orientation difference between the first observed keypoint of the query image and the first observed keypoint of the target image under arbitrary transformation.

In a first embodiment of present application, a test is carried to establish the rotational orientation of the first observed keypoint of the query image relative to the target image position. The test is performed by evaluating each of the N possible first observed query keypoint combinations and choosing the best sequence match.

In a second embodiment of the present application, the N possible first observed query keypoint combinations are pre-calculated in advance and stored as additional candidate fingerprint sequences to match against. At query time, any query fingerprint that matches one of the N pre-computed combinations is considered to be a match. The likelihood of the wrong query fingerprint actually matching one of the extra combinations is small. The main advantages of the second embodiment are in enabling higher matching performance and lowering the query computational load relative to the first embodiment, at the expense of somewhat larger storage to contain the additional candidate first keypoint fingerprint combinations.

In a third embodiment, a Smallest Least Common Quantization Digit method (SLCD) is used. In the first step, a histogram of the fingerprint digit sequence is performed to determine the smallest least common quantization digit. Consider as an example the following single fingerprint sequence:

Fingerprint="1460361637675632632244776626652206667"

The digits of the fingerprint sequence are counted to determine how many there are of each value type. For example, the above fingerprint has two '0' digits, two '1' digits, six '2' digits, four '3' digits, two '4' digit, and so on. The smallest least common digit is the smallest least frequent digit that appears at least once in the fingerprint sequence, that is, with the smallest non-zero count. In the above fingerprint example, the smallest least frequent digit is the digit '0', since no digit has a count of one, and there are at least three digits with a count of 2 in the fingerprint sequence ('0', '1' and '4'), and '0' is smaller than the other digits '1' or '4'. The priority is always given to a smaller count in order to minimize the number of permutations overall.

After determining the value of the smallest least common digit in the fingerprint sequence, the sequence is scanned to determine the positions of the smallest least common digit within the fingerprint sequence. For each position, the beginning portion of the sequence up to the location of the smallest least common digit is permuted to the end of the fingerprint sequence, while keeping the internal sequence of the beginning and end portions unchanged. Thus the number of permutations varies from one fingerprint to another. For each fingerprint sequence, the number of permutations is equal to the smallest least common digit count of the fingerprint. The advantage of the SLCD method is that it seeks to minimize the number of permutations per fingerprint at a good balanced computational load without requiring an exhaustive search throughout the space of all possible fingerprint sequence digit permutations.

For the sample fingerprint case above, the resulting permutations in accordance with the SLCD embodiment method include the following two candidate sequences:

Permutation 1 = "03616376756326322477662652206667146"
                                                  ^
Permutation 2 = "06667146036163767563263224776626522"
                     ^

Thus the query fingerprint will be sorted and matched against two candidate fingerprint permutations in this example. Each permutation is formed by shifting the original fingerprint sequence from the beginning up to the location of the smallest lease common digit ('0' in this case) to the end of the permuted fingerprint sequence. The '^' marker underneath the permutation sequence indicates the location of the end of the original fingerprint sequence for illustration purpose. In the embodiment of the present application, the permuted fingerprint sequences are used instead of the original fingerprint sequences. The advantage of using the permutation is that it considerably reduces the number of candidate fingerprint sequences that need to be matched against. Rather than examining all the possible cyclic combinations of the original fingerprint sequence, only a few permutations of the smallest least common digit are investigated. The permutation are generated and stored in advance during the Fingerprint Data Base preparation. At query time, only the first permutation of the query fingerprint sequence is used for matching, and there is no need to check for additional query permutations since all permutations have been stored in advance and the correct one will be automatically found.

The use of permutations in accordance with the embodiment of the present application provides a significant performance boost for a slight storage increase, since the number of permutations, on average, is much smaller than the original fingerprint sequence length.

I.b.2. Fan-Tree

An aspect of the present application is the method of organizing the fingerprint information in a unique manner in order to facilitate fast and efficient fingerprint matching. Existing methods use a hashing scheme for matching fingerprints between the query image and candidate fingerprints in the document collection. Instead, the present system and method uses a tree-based method called the Fan Tree as a method for indexing fingerprints, which are sequences of integers. Unlike common hashing techniques, the Fan Tree allows for efficient near-neighbor fingerprint search in a high-dimensional space (e.g., near-miss fingerprints with identical sequences except for one or a few digit changes), and is at least as fast as the hashtable approach.

Figure 15:
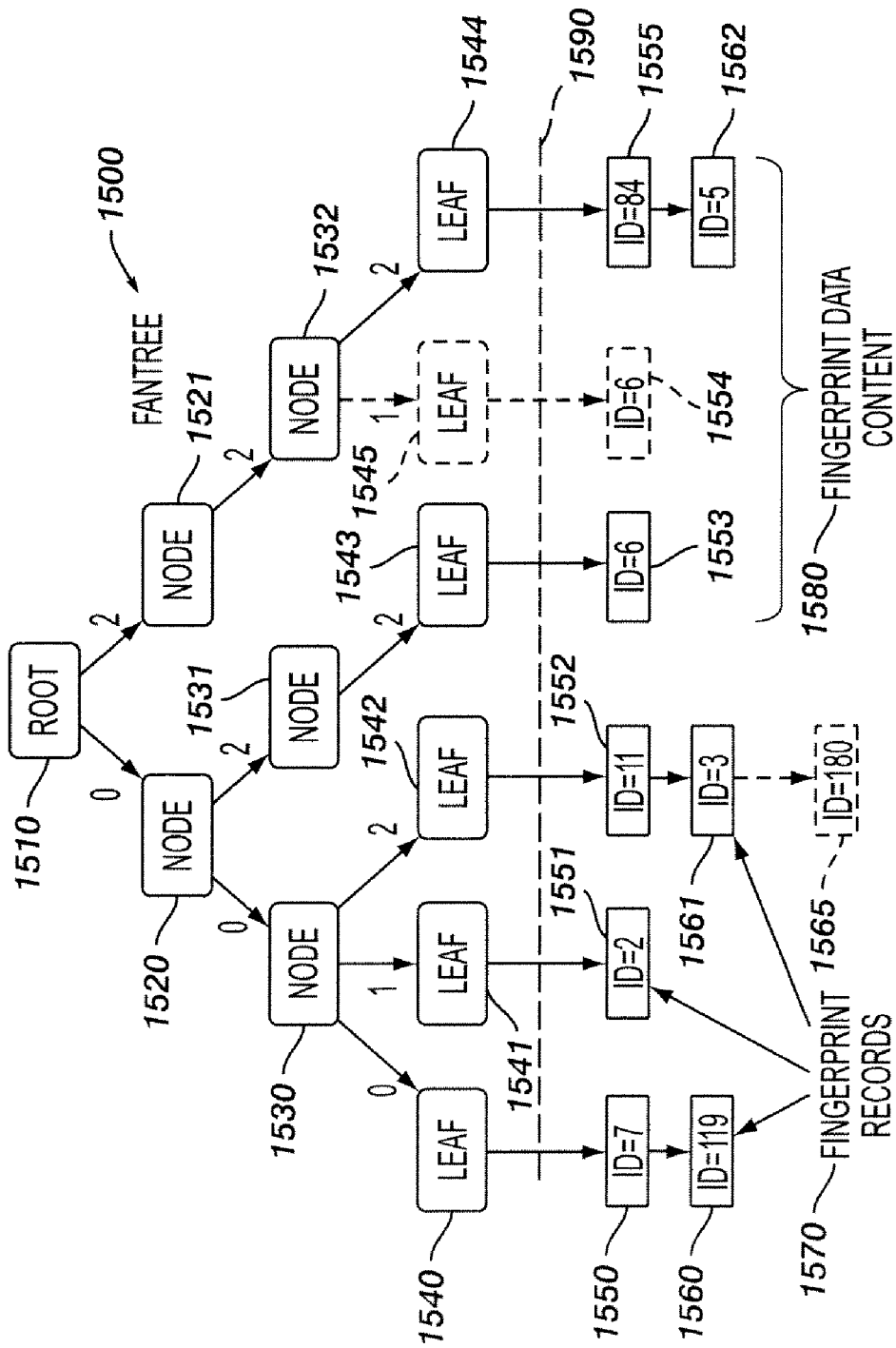
FIG. 15 is an illustration of a Fan Tree Structure and Corresponding Fingerprint Data Content.

FIG. 15, illustrates a Fan Tree structure and corresponding organization of the fingerprint content 1500 used to organize the stored data. The Fan Tree is comprised of three types of nodes: (a) a root node 1510; (b) intermediate level tree nodes (e.g., 1520, 1521, 1530, 1531 and 1532); and (c) terminating leaf nodes at the ends of branches (for example, 1540, 1541, 1542, 1543 and 1544). The Fan Tree begins at the root node 1510. The root and intermediate level nodes each have up to N (in this case N=8) children, one for each quantization level of persistent area ratios. A fingerprint is therefore a path from the root to a leaf node of the Fan Tree, traced by the branches taken.

For example, the path (1510-1520-1530-1540) in FIG. 15 corresponds to one fingerprint, leading from the root node 1510 to a particular Leaf node 1540. This particular representation of a fingerprint (in this simple example) uses 3 branching codes (i.e., "take the left path in each node"—which is, the (0)-labeled branch 3 times) to arrive at the destination Leaf node 1540.

The potential size of a Fan Tree is large, in this case 8*8^35, but the actual Fan Tree is sparsely constructed because branches are only constructed at any given node for fingerprints that actually occur in the database. Near the root, many nodes will contain the full 8 branches, but a few levels down only a few branches may be expanded.

A Leaf node is different from the other tree node types in that it has no outgoing branches. Instead, each valid Leaf node is pointing to a linked list data structure containing a list of fingerprint records 1570, including, but not limited to elements (1550, 1551, 1552, 1553, 1554, 1555, 1560, 1561, 1562 and 1563) in FIG. 15, to be matched against the query fingerprint at query time. These also constitute fingerprint data content 1580.

The fingerprint data is efficiently organized to facilitate quick access to the relevant fingerprint records in the data base, while at the same time eliminate the need to investigate any fingerprint records that are irrelevant with respect to the current query fingerprint of interest.

The Fan Tree approach enables two ways to deal with near-miss fingerprints, which have almost the same integer sequence except for a few digit changes: (1) near-miss fingerprint combinations can be computed and prestored in the Fan Tree. (2) near-miss fingerprint combinations can be computed from the query fingerprint sequence during query time, and backtrack the Fan Tree path at lookup time. The first method has the advantage of performing most of the computations offline at the expense of larger memory to store the additional near-miss fingerprint combinations. The second method, on the other hand, requires additional computations in real query time, but it needs no extra memory for storage.

The Fan Tree 1500 enables efficient system performance and the ability to scale up to very large collections of documents (containing millions of documents, for example). The Fan Tree is particularly suitable for large document collection sizes. In fact, with good fingerprint design, lookup time using the Fan Tree increases only slowly with document collection size. It is noted leaf 1545 and fingerprint records 1554 and 1563 are depicted in dotted line. This is intended to acknowledge the Fan Tree can add and/or delete items such as but not limited to elements as shown by the dotted lines.

I.b.3. Building a Fan-Tree from a Document Corpus

Figure 16:
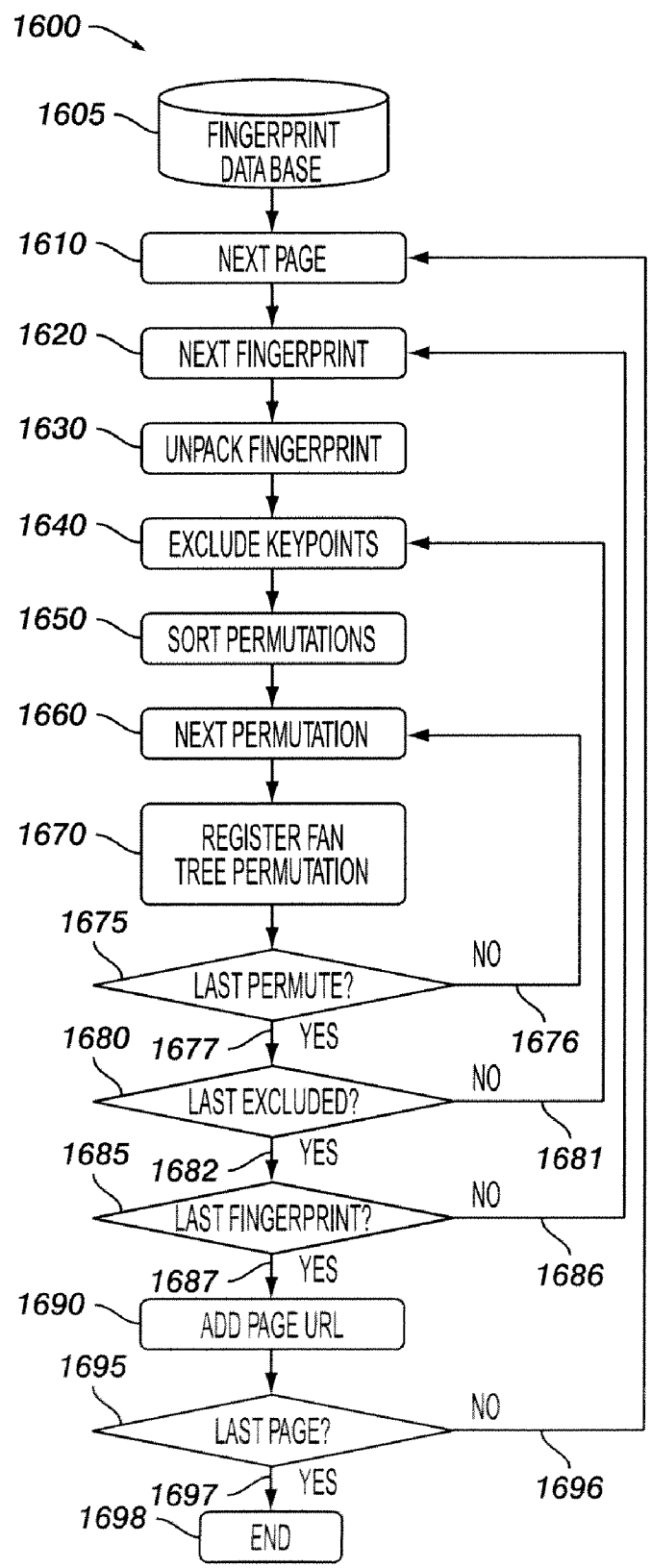
FIG. 16 is a flow diagram of the steps for building a Fan Tree Structure from a Document Collection Fingerprint Data Base.

As illustrated in FIG. 16, the fingerprints in the Fingerprint Database 1605 are stored in a packed compact format to reduce memory size and loading time. This section describes how to build the Fan Tree from the compact Fingerprint Database that is extracted from a document collection. It is only necessary to build the Fan Tree once for a given document corpus. After the Fan Tree has been built, the Fan Tree data structure (containing the fingerprint data) can be kept in memory and subsequently re-used for any number of image queries.

The process of building the Fan Tree from a given Fingerprint Database is shown 1600. The process begins by reading the fingerprint database content, one page image at a time using the Next Page module 1610. For each page, the following information is retrieved from the database: (a) The unique image ID assigned by the Unique Image ID module at Fingerprint Database creation time; (b) The number of identified fingerprints on the current page; and (c) The content of fingerprint records for the current page.

The unique image ID is an internal integer representation that uniquely identifies the particular page image as well as the document it belongs to. The image ID representation is conveniently used for internal indexing (because it is more compact and takes less space than using a conventional Universal Resource Locator (URL) string for that document). The actual document content is never stored in the fingerprint database, only the fingerprint information.

After the current page content has been retrieved from the fingerprint database 1605 by the Next Page module 1610, the flow proceeds to retrieve the fingerprint records for the current page and use them to build the Fan Tree structure, one fingerprint at a time. The Next Fingerprint module 1620 retrieves the current packed fingerprint record (e.g., of length 70) from the database as long as there are yet more fingerprint records to be processed in the current page. The Unpack Fingerprint module 1630 then unpacks the fingerprint content, and proceeds to exclude one or more keypoints by the Exclude Keypoint module 1640 as described in Section I.b above, leading to eight length-35 fingerprints to be stored in the Fan Tree.

The particular path of the current fingerprint may or may not already exist in the Fan Tree. If the current fingerprint path, or part thereof, does not exist in the Fan Tree, the missing parts of the path are added to the Fan Tree, and a new Leaf node is initialized to contain the current fingerprint record as well as the unique image ID number of the current page and the current fingerprint number. If, on the other hand, the current fingerprint path already exists in the Fan Tree, then the Fan Tree structure is left unchanged, only the current fingerprint record as well as the unique image ID number of the current page and the current fingerprint number are added and linked to existing Leaf node list. Thus the Fan Tree structure is built from the bottom up, one fingerprint at a time, and will only contain nodes and branches that represent real fingerprint data that is actually being observed during database creation.

For each candidate fingerprint at the output of the Exclude Keypoint module 1640, the Sort Permutations module 1650 then processes the candidate fingerprint combinations to generate the permutations of the fingerprint sequence in accordance with the smallest least common quantization digit (SLCD) algorithm as described in Section I.b.1 above.

The output of the Sort Permutations module 1650 is the list of permuted fingerprint quantized ratio sequences for the current fingerprint of interest. The list is always guaranteed to contain at least one permutation entry in accordance with the properties of the smallest least common digit algorithm of the present application. Occasionally, there may be more than one permutation in the list of permuted fingerprint sequences. The number of permuted fingerprint sequences in the list (i.e., the list size) is the smallest least common digit count for the current fingerprint of interest. Note that in the embodiments of the present application not using permutations, the Sort Permutations module 1650 is bypassed, passing the un-permuted fingerprint sequence from the Exclude Keypoint module 1640 directly to the output of the Next Permutations module 1660.

The Next Permutation module 1660 retrieves the current fingerprint permutation sequence from the output of the Sort Permutations module 1650. Each permuted fingerprint is sequentially registered. The Register Fan Tree Permutation module 1670 registers the current permutation in the Fan Tree and adds a corresponding data record to the existing Fingerprint Data Content. The registration process is equivalent to building the Fan Tree from the bottom up, by adding only the nodes and branches necessary to describe the new fingerprint sequence. If the entire fingerprint path already exists in the Fan Tree, the tree structure is not modified, and only the current fingerprint record is added to the existing Fingerprint Data Content by linking it to the last previous entry.

If, on the other hand, the new fingerprint path does not already exist in the Fan Tree in its entirety, the missing tree nodes and branches are added to the Fan Tree as necessary to complete the path. In addition, the current fingerprint record is added to the existing Fingerprint Data Content and linked with the newly formed Leaf node. The end result is that the Fan Tree is expanded to include the current fingerprint, and its content record is added, one fingerprint path at a time, to the Fingerprint Data Content.

The process of Fan Tree registering the next fingerprint permutation and adding its data record 1670 continues sequentially, one permutation at a time, until the last permutation is detected by the Last Permutation module 1675. While the current permutation is not yet the last permutation 1676, the Last Permutation module 1675 routes the flow back to obtain the next permutation 1660 and proceed to register its content in the Fan Tree. This continues until the last permutation has been processed 1677.

After all permutations of the current fingerprint of interest have been registered in the Fan Tree, the procedure moves on to the Last Excluded Keypoint module 1680. If this is not the last candidate fingerprint combination 1681, the process is routed back to the Excluded Keypoint module 1640 to process the next candidate fingerprint combination with the next keypoint being excluded. This continues until all the possible combinations of excluded keypoints have been registered in the Fan Tree 1682 and their content added to the Fingerprint Data 1605.

The process of unpacking, excluding keypoints, sorting the permutations, and registering all the resulting permutations in the Fan Tree continues sequentially, one fingerprint combination at a time, until the last fingerprint is detected by the Last Fingerprint module 1685. While the current fingerprint is not yet the last fingerprint 1686, the Last Fingerprint module 1685 routes the flow back to the Next Fingerprint module 1620, to obtain the next fingerprint and proceed to unpack, sort the permutations, and register all of them in the Fan Tree and associated Fingerprint Data Content. This process continues until the last fingerprint for the current page of interest has been processed 1687.

Once all the fingerprints of the current page of interest have been processed in the manner described above and all their permutations successfully registered in the Fan Tree and added to the Fingerprint Data Content, the Add Page URL module 1690 retrieves the current page URL (Universal Resource Locator) and adds the reverse mapping from the internal unique image ID to the true document URL in a separate table (data structure), independent of the Fan Tree or the Fingerprint Data Content. Because it is more compact, the unique image ID number is internally used for referencing the current page of interest throughout the entire process.

Finally, the processing of pages to retrieve their fingerprints from the Fingerprint Data Base 1605, unpack, sort, and register all permutation in the Fan Tree and Fingerprint Data Record continues sequentially, one page at a time, until the last page is detected by the Last Page module 1695. If the current page is not the last page yet 1696, the Last Page module 1695 routes the flow back to the Next Page module 1610, to obtain the next page and proceed to register 1670 its fingerprint permutation content in the Fan Tree and associated Fingerprint Data Content. This process continues until the last page has been prepared for initial query use 1697 and the process ends 1698.

The entire process of Building the Fan Tree can be done offline before the first image query. Once the Fingerprint Data Base has been prepared in accordance with the embodiment of the present application, it can be reused with subsequent image queries. It is only necessary to rebuild the Fan Tree in case the reference image data has changed, such as after the addition or removal of some target images.

I.b.4. Noise Guard Method

This section introduces another concept, identified as a Noise Guard method and system to overcome existing problem and lead to superior fingerprint matching performance. While introduced in this section following sections provide more detailed discussions of the Noise Guard.

A key problem with fingerprints is that they quantize a continuous-valued space of triangle area ratios into a discrete space. A problem occurs when a persistent ratio falls near a quantization boundary, as even a small change in the location of a keypoint due to noise and/or finite rounding errors, for example, can inadvertently cross the current quantization interval boundary and lead to a different quantized integer value for this position of the fingerprint.

Figure 19:
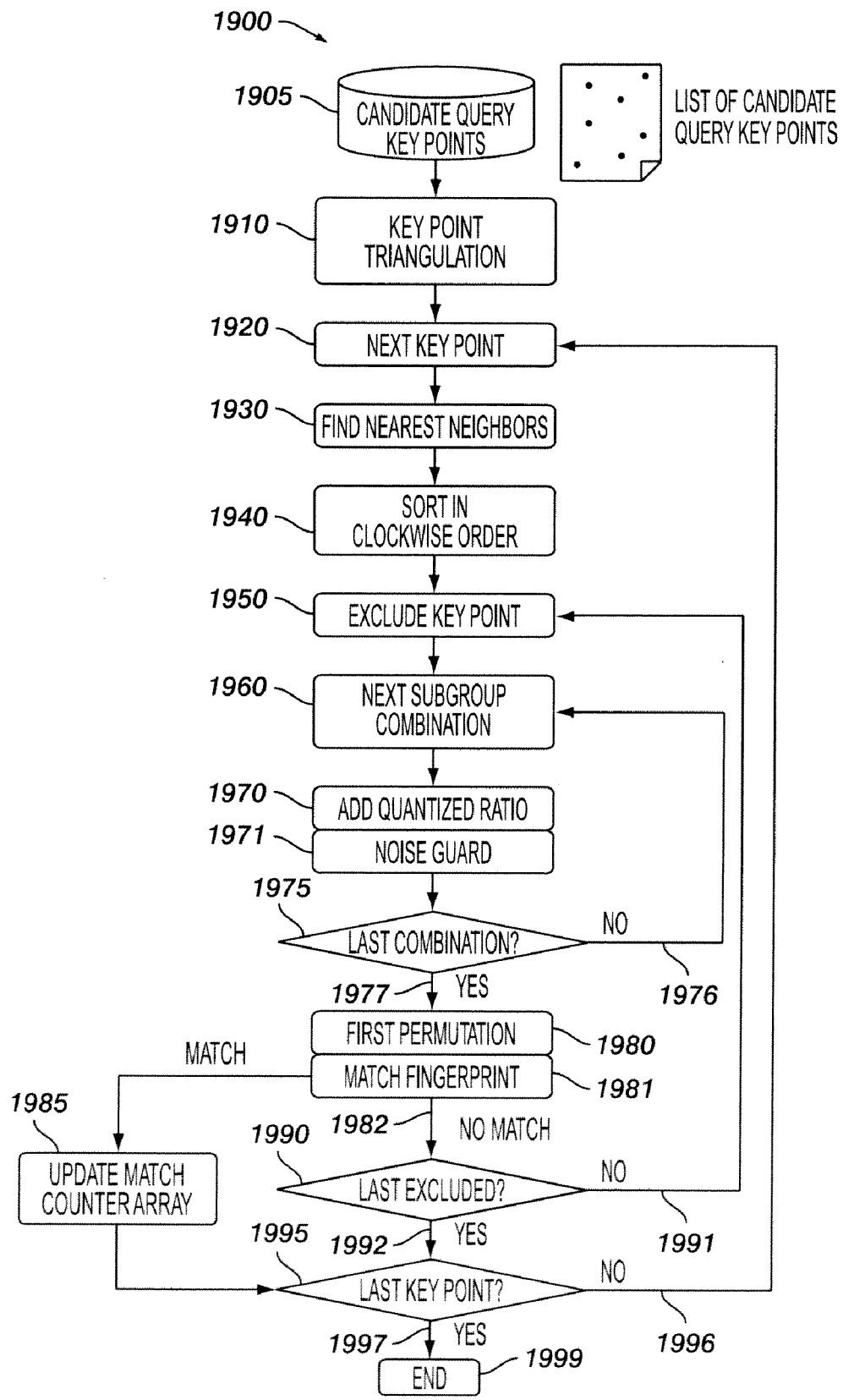
FIG. 19 is a flow diagram of the steps for Query Fingerprinting.

In FIG. 19 the Noise Guard module 1971 is designed to address cases where one or more of the triangle ratios in the query fingerprint sequence happen to fall very close on either side of one of the quantization thresholds. If the distance from a persistent ratio value to its nearest quantization thresholds is below a pre-specified tolerance level, the Noise Guard module 1971 generates both quantization sequences as possible candidates, such that the correct choice is included as one of the resulting candidates.

Consider the fingerprint "14603616376756326322477662652206667".

Assume the value of the fifth persistent ratio is 0.9999, which is just below an interval boundary of 1.0, and thus gets quantized to an integer value of '3' as shown in FIG. 9. This is for the target image in the collection.

In the degraded query image, the presence of noise or some small rounding errors in the calculation of this persistent ratio could well push its value just above the interval boundary, say to 1.0001 (a very small change of 0.0002 from 0.9999). Because it is now larger than 1.0, it will get quantized to '4' instead of '3', and the resulting query fingerprint will no longer match. "14604616376756326322477662652206667". The branching at the fifth digit will now lead you on an entirely different Fan Tree path.

The Noise Guard method monitors the incoming persistent ratio before quantization to see if they happen to fall close to an interval boundary. Only for those that fall close enough, both fingerprint sequences are entered into the Fan Tree. That is, instead of a single fingerprint sequence, two fingerprints are entered: one with a '3' and one with a '4' for the target image.

At query image time, the query fingerprint is computed and it doesn't matter if a '3' or '4', because either one exists in the Fan Tree and a correct match will always be found.

The power of the Noise Guard method is that it only adds the combinations when they fall close to the interval boundaries. Otherwise, if you attempted to blindly do it for all the digits, you would generate $2^{35}$ possibilities for each fingerprint which is impractically large.

It should also be pointed out that the conventional hashing schemes are sensitive to such digit changes because they are designed to randomly 'hash' the input sequences, such that two nearly identical sequences of digits would typically end up far away from each other with no effective way of determining the location of one by knowing the location of the other. That is one advantage of using the Fan Tree.

Thus, an advantage of using the Noise Guard module 1971 is that it improves the fingerprinting robustness by reducing the quantization noise sensitivity. However, this is accomplished at the expense of additional computations, since each time the quantization falls near the threshold, the number of candidate fingerprint sequences is doubled. Fortunately, the event of a triangle ratio falling near the threshold is quite rare, depending on the query image noise level, so the impact, on average, is not very significant. In addition, a maximum limit is set on the number of times that the Noise Guard is applied in each fingerprint in order to maintain the overall performance level (since a fingerprint with many triangle ratios falling near the quantization thresholds is not very distinctive). In one implementation the Noise Guard module has been used with a limit of 5 digit changes per fingerprint, or $2^5=32$ possible fingerprint combinations for each fingerprint.

The Noise Guard method can be applied either offline during document collection pre-processing time, or online at query time. From the storage perspective, it is more economical to generate the additional noise combinations at query time rather than for the entire collection in advance.

Applying the Noise Guard at query time, however, may slightly decrease the real time performance due to the additional computations. The tradeoff between storage and real time performance can be optimized depending on the expected noise level and likelihood of quantization errors.

I.c. Runtime Query

Figure 17:
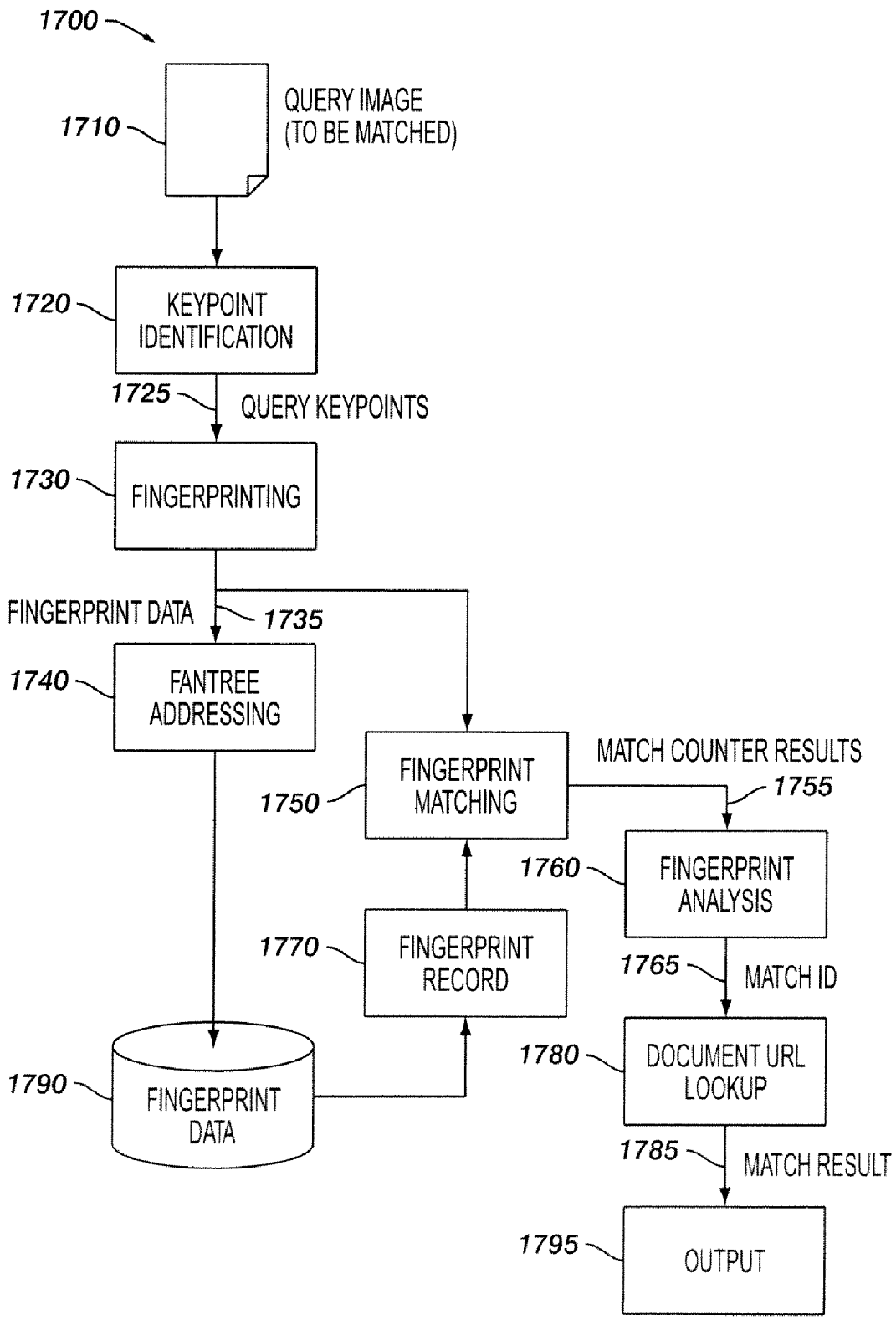
FIG. 17 is a flow diagram of the steps for Matching a Query Image in Real Time.

The process of matching a query fingerprint 1700 is illustrated in FIG. 17. The query image 1710 to be matched is presented at the input. The query image 1710 is processed to identify the candidate keypoint locations by keypoint identification step/module 1720. The keypoint identification process in 1720 is similar to the process that is used for finding keypoints for the document corpus, with notable differences relating to the expected lower quality of query images.

Query keypoints 1725 are processed in small local neighborhood groups to generate candidate query fingerprints in Fingerprinting step/module 1730 for matching. The fingerprinting method for query images is similar to the fingerprinting method for the document corpus, with notable exceptions relating to the expected lower quality of query images such as the Noise Guard method, and a different query fingerprint permutation scheme.

In one embodiment of the present application, all available keypoints are used. In another embodiment, the available connected components are sorted by relative strength such as, but not limited to, weighted optimum of the connected component dimensions, pixel count, aspect ratio, and/or proximity to other connected components, and only a smaller subset of connected components is outputted. In a third embodiment, the input image area 1710 may be sub-divided into a set of (overlapping or nonoverlapping) regions, and a number of connected components selected from each region to prevent one region from dominating all others. In yet a forth embodiment of the present application, the Fingerprinting module 1730 may only select the most indicative candidate query fingerprints based on an analysis of the frequency of digit or digit pattern occurrence in the fingerprint sequence since rare and unusual digit patterns are more indicative. The output of the Fingerprinting module 1730 is the list of candidate query fingerprints 1735 for each group of local keypoints.

The candidate query fingerprint 1735 list may include all or just a subset of all identifiable fingerprints, depending on the particular application and the desired performance level, in terms of processing time and accuracy. For example, only a small subset of the most indicative fingerprints may be selected based on the relative fingerprint strength. Alternatively, all available candidate query fingerprints may be used for best accuracy, which may increase processing time. Thus the number of candidate fingerprints at the output of the fingerprint module 1730 can be adjusted as tradeoff between accuracy and speed.

The query fingerprints of Fingerprinting module 1730 are then subsequently converted to Fan Tree paths by the Fan Tree Addressing module 1740, which determines the corresponding matching Leaf node for each query fingerprint. Each fingerprint corresponds to a path in the Fan Tree, starting from the root node and terminating in a specific Leaf node. The Fan Tree Addressing module 1740 follows the path of each candidate query fingerprint to determine the corresponding Leaf node address. The Leaf node content is looked up in the fingerprint data structure 1790, to retrieve the list of matching fingerprint records 1770 for the particular Leaf node.

The candidate query fingerprint information of Fingerprinting module 1730 is subsequently matched in the Fingerprint Matching module 1750 against each fingerprint entry 1770 included in the Leaf node list of fingerprint records 1770. Only when there is an exact match between the candidate query fingerprint 1730 and a particular fingerprint record of Fingerprint Record module 1770, the system retrieves the corresponding image ID and fingerprint ID combination from the matching fingerprint record 1770, and proceeds to initialize (first time only) and increment a designated fingerprint counter for the unique "<image ID/fingerprint ID>" combination in a counter array. The system also maintains, in a separate data structure, a list of image IDs that have been encountered with at least one matching fingerprint during the fingerprint matching phase 1750. The fingerprint matching process 1750 continues until all candidate query fingerprints 1730 have been processed in this manner. The resulting match counter results 1755 array content is then forwarded to the fingerprint analysis phase 1760 for final highest score analysis and determination of the best matching document or set of documents within the collection.

The fingerprint analysis phase 1760 analyses the content of the match counter array to determine the final matching result. The specific fingerprint analysis 1760 depends on the particular matching objective of the application. There could be a number of possible matching objectives. In one embodiment of the present application, the objective may be to find the best image match within the document collection. In this case, the image ID which has gathered the most fingerprint matches, namely the fingerprint match ID 1765 with the highest score is a good candidate. In addition, the individual counts can be used as confidence numbers to rule out any page matches with fewer than a pre-specified minimum number of fingerprint matches. The counts can also be normalized by the total number of fingerprints on a page to provide a more uniform relative measure since some pages may have many more fingerprints than others, depending on the image content.

In another embodiment of the present application, the objective may be to return the list of all matching images within the collection or a subset thereof that meet a pre-specified minimum of fingerprint counts or a minimum confidence level as above. In yet another embodiment of the present application, the original image area may be subdivided with or without overlapping into a grid of sub-images, and the fingerprint matching analysis be carried separately in each sub-image in order to provide a rough density profile of the areas where good fingerprint matching is obtained. The latter analysis is particularly suitable for situations where some of the original image may be missing or partially obscured by another object in the scene. In this case, the common image areas which are not missing or obscured will still have a high degree of matching fingerprint counts. In yet another embodiment of the present application, the zoning of the image by dividing into sub-images as outlined above can be used to emphasize the weight of certain image areas over others. For example, giving more weight to fingerprint matches near the center of the image, where the focused object may be, and less weight to fingerprint matches on the outer periphery. This approach is particularly useful for eliminating frame boundary artifacts along the image outer boundary. For instance, when matching images from different sources such as an electronic original and a captured image, such as, but not limited to, from a scanner or cell phone camera, of a printed version of it. The latter technique can be effectively used to prevent the formation of candidate keypoints due to the introduction of artificial background outside the image boundary, such as, but not limited to, image corners against paper white or blue screen color, etc.

The output of the Fingerprint Analysis module 1760 is the final list of matching image IDs 1765. In the last step 1780, the list is converted from the internal integer representation of the unique image ID 1765 to the true document URL (Universal Resource Locator), which identifies the location of the matching document and page number. The conversion is accomplished in the Document URL Lookup module 1780 and a match result 1785 is produced. In one embodiment, an inverse mapping table, created by Unique Image ID module at the time of the generation of the fingerprint database 1790, is used to look up the URL using the unique image ID as an index finally, the matched result 1785 is passed to an output 1795 which may be a display, such as an electronic display, a printer to provide a hardcopy output, a memory storage, or it may be transmitted to other compatible devices.

I.c.1 Identifying Candidate Query Keypoints

Figure 18:
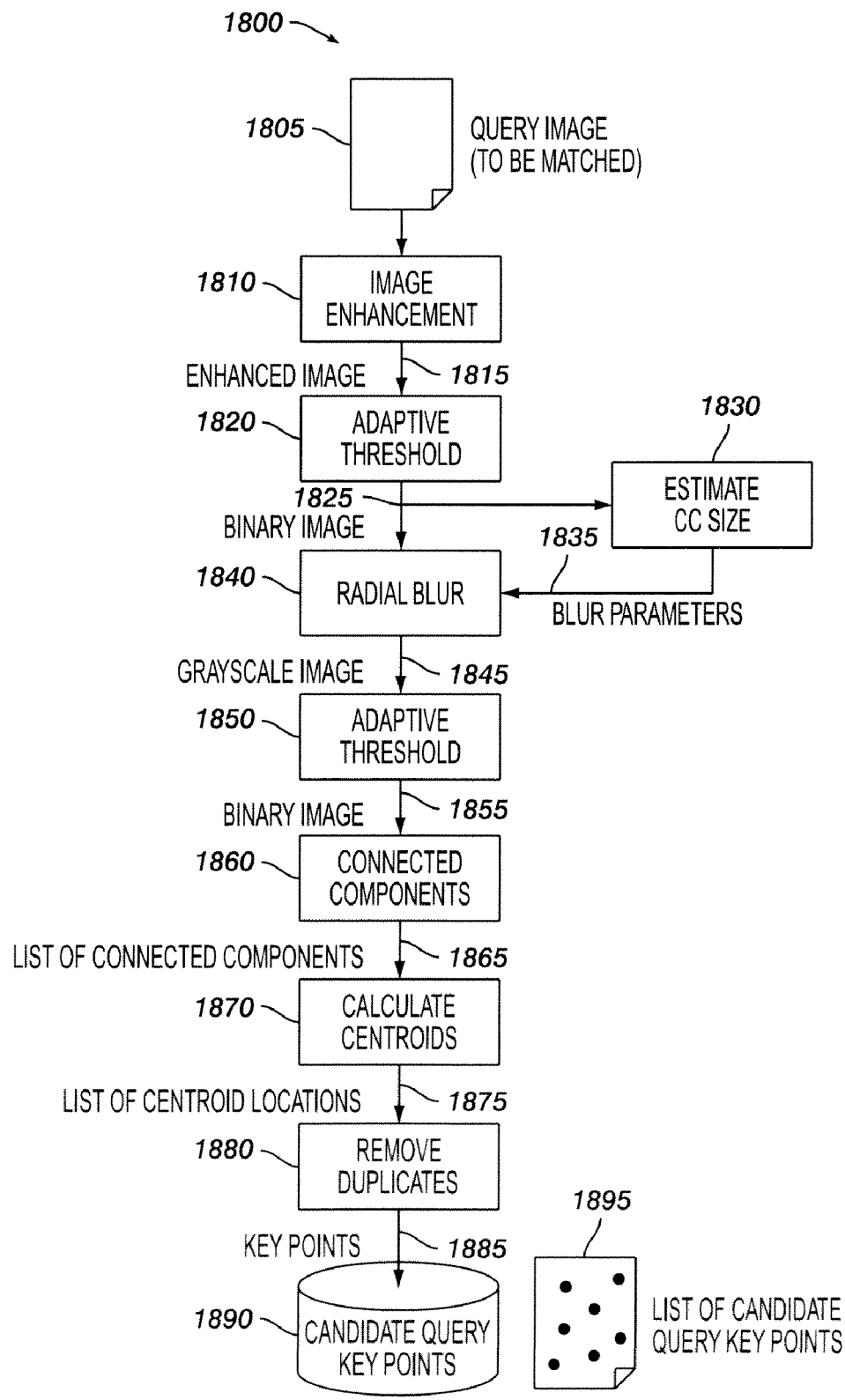
FIG. 18 is a flow diagram of the steps for identifying Query Candidate Keypoints.

The query keypoint identification process 1800 is illustrated in FIG. 18. The query keypoint identification process is similar to the process that is used for finding keypoints for the document corpus.

A difference from the description in Section I.a.1 above is that an Image Enhancement module 1810 is introduced in order to address the potentially lower quality of query images to be matched 1805 relative to the target document collection. In certain applications the query images may be subject to additional quality degradation. For example, the query images may be captured with a low-quality cell phone camera, from a printed hard copy or a screen version of the target image. In this situation, the query image may exhibit considerable image degradation due to a number of factors such as: low resolution, blur, noise, varying illumination, reflection, perspective viewing distortions, etc. Thus, depending on the anticipated quality of the query images, it is desirable to add a first Image Enhancement module 1810, in order to apply the necessary image enhancements for improving the input image quality to produce enhanced images 1815 prior to query keypoint identification. The specific enhancements and modifications to the Image Enhancement module 1810 module on the application, the expected quality of the query images, the anticipated image distortions, and the desired accuracy and performance goals.

In one embodiment of the present application, the Image Enhance module 1810 includes a background estimation module to estimate the varying camera illumination across the query image scene. The background estimation may include the estimation of the brightest pixel level in certain pixel areas and fitting a low-order two-dimensional polynomial curve to model the slowly varying illumination across the query scene. By inverting the polynomial model, the effects of the varying background illumination across the image can be neutralized and prevented from interfering with the adaptive thresholding operation 1820 and potentially failing to adequately identify bright or dark keypoint features.

In other embodiments of the present application, the Image Enhance module 1810 includes other known image processing techniques such as contrast enhancement, sharpening, and noise removal in order to further improve the query image quality prior to keypoint extraction.

The binary output image 1825 of the Adaptive Threshold module 1820 is sent to an Estimate CC Size module 1830. The purpose of the Estimate CC Size module 1830 is to dynamically estimate, for the query image 1805 on an image by image basis, the blur parameters 1835 or blur filter size to be applied in the subsequent Radial Blur module 1840. The objective of the blurring process is to provide robust, reliable, and repeatable keypoint identification. The blurring also helps to remove noise such salt and pepper noise and eliminate small isolated features on the page. The shape of the blurring filter for example, but not limited to an approximated Gaussian shape, should be smooth enough to prevent from introducing undesirable artifacts.

One issue in determining the right amount of blurring is that the size of a typical text character on the input page is not known in advance. A first embodiment of the present application discloses the Radial Blur parameters 1835 fixed and pre-determined in advance to provide a good compromise across a range of standard type formats such as for 10 to 14 point Roman fonts. In a second embodiment of the present application, the Radial Blur parameters 1835 are made selectable such that the user may specify the optimum setting to apply on a document by document basis. In either one of these embodiments, the Estimate CC module 1830 is not used, and its output is replaced by the selected predefined Radial Blur parameters 1835.

In a third embodiment of the present application, the Estimate CC module 1830 is used to automatically estimate the optimum Radial Blur parameters by examining the Input query image 1805 content. In this case, the Estimate CC module 1830 uses the binary output from the Adaptive Threshold 1820 module. The Estimate CC module 1830 processes the binary image 1825 to gather connected-component elements, and proceeds to histogram the connected-component height, because character height is less variable and more indicative of the font size than character width in most Roman languages. The height histogram is used to determine the appropriate Radial Blur parameters based on the frequency of occurrence. During the process, the Estimate CC module 1830 takes care to eliminate noise-induced connected-components such as when the dimensions are too small when comprised of a few isolated pixels, or the dimensions are too large when a line or frame is encountered around the page, so that the estimate provided is not biased by a few unusually large or unusually small connected component elements. In addition, since pages may contain a mixed assortment of font sizes, the Estimate CC algorithm has been designed to provide a conservative estimate with good compromise even in the case of a mixed font set.

In a fourth embodiment of the present application, the Estimate CC size module 1830 may dynamically provide adaptable blurring parameters based on analyzing the Input image content in localized sub-image regions and adaptively varying the blurring parameters from one region to the next; For example, when dynamically moving from one image area containing primarily small point text to another nearby area containing larger fonts.

The output of the Radial Blurring module 1840 is a grayscale image 1845. The Adaptive Threshold module 1850 converts the grayscale Radial Blur 1840 image output 1845 to binary black and white output 1855 by adaptive thresholding 1850.

The binary output of the second Adaptive Threshold module 1850 is a binary image 1855 and is forwarded to the Connected Component module 1860. Connected component methods are well known in the art.

In a first embodiment of the present application, all the available connected components are used. In a second embodiment, the available connected components are sorted by relative strength, for example, giving weight to optimum of the connected component dimensions, pixel count, aspect ratio, and/or proximity to other connected components, and only the smaller subset of connected components are outputted. In a third embodiment, the input query image 1805 may be sub-divided into a set of overlapping or non-overlapping regions, and a number of connected components selected from each region to prevent one region from dominating all others.

The Calculate Centroid module 1870 determines the visual center of each connected component 1865 at the output of the Connected Component module 1860. For each connected component, the horizontal centroid location is calculated by summing together the horizontal coordinates of each member pixel of the connected component and dividing the outcome by the total number of member pixels. The vertical centroid location is likewise calculated by summing together the vertical coordinates of each member pixel and dividing by the number of member pixels. The summation can be effectively done on-the-fly during the connected component analysis. Note that only the pixel members of a given connected component contribute to its centroid location, ignoring any other non-member pixel "holes". The visual centroid of each connected component is calculated with subpixel precision, since in many languages the connected components tend to be situated in text lines.

In the last processing step of the keypoint identification phase, the list of connected component centroid locations 1875 from the Calculate Centroid module 1870 is validated by the Remove Duplicates module 1880, which produces a list of keypoints 1885. The purpose of the validation is to ensure that no two connected component shall have the same centroid locations within a given tolerance level. Duplicated connected components with nearly the same centroid locations are eliminated.

The list of remaining connected component centroids at the output of the Remove Duplicates module 1880 becomes the list of candidate query keypoints 1895. The overall number of keypoints 1890 depends on the Input image content and the type of connected component processing. There can be several hundred keypoints for a typical machine printed page.

I.c.2 Computing Query Fingerprints

This section introduces processes of identifying query fingerprints and preparing them for matching against the relevant document collection fingerprints in the Fan Tree structure. The query fingerprinting process is illustrated in FIG. 19. The fingerprinting method for query images is similar to the fingerprinting method for the document corpus. However, there are a number of notable differences including but not limited to concepts relating to the expected lower quality of query images, introducing a Noise Guard method and providing a different query fingerprint permutation scheme:

(a) A difference is that the query fingerprints are not packed since there is no need to save the query fingerprints in the Fingerprint Database. Instead, the query fingerprints are merely processed and matched, one query fingerprint at a time. Each query fingerprint is looked up the Fan Tree to retrieve the list of relevant candidate fingerprints to match against. Once the matching process of a given query fingerprint is complete, the query fingerprint is discarded, and only the matching results in terms of the match counter array continue to accumulate per query page from one query fingerprint to the next.

(b) The query fingerprinting requires no Sort Permutation step because the permutations are generated in advance during the preparation phase of the document collection; at query time only one permutation, the first one to occur, is used. Since all the possible permutations have been prepared and registered in advance in the Fan Tree, any valid permutation should have a corresponding match.

(c) The Noise Guard method described in section I.b.3 above can be applied during the Fan Tree preparation phase, or alternatively, at query time. Applying the Noise Guard method at query time is more economical in that it requires no extra storage memory, and the Fan Tree provides a convenient way for handling near-miss fingerprints, for a slight increase in computations.

(d) Another difference is related to the need to minimize the query matching time. In many applications the query matching occurs in real time, while the system is expected to meet or exceed certain tight performance requirements. In such situations it is generally desirable to have an unbalanced, front-loaded system that allocates more time to sorting out potential fingerprint combinations and preparing whatever possible in advance in order to minimize the actual query matching time. For example, during the offline stage of building the Fan Tree, the method of the present application registers in advance all the possible fingerprint permutations including for combinations of missing keypoints. Any one of these combinations is sufficient to obtain a fingerprint match. Once the first match is observed, there is no need to continue looking for additional matches for the particular fingerprint. The overall query time is minimized by sorting and placing the more likely matches first in the Fan Tree.

(e) Further, the first query permutation to match will stop any further permutation search for the particular fingerprint and other missing keypoint combinations in order to minimize the overall matching time in accordance with the embodiment of the present application.

I.c.3 Query Fingerprinting of Mixed Text Documents in Detail

This section describes in detail the process of identifying query fingerprints and preparing them for the matching against the relevant document collection fingerprints in the Fan Tree and its associated Fingerprint Data structure.

The query fingerprinting process is similar to the original fingerprinting method as described in Section I.c.2 above. However, there are several distinct differences. One difference is that the query fingerprints are not packed since there is no need to save the query fingerprints in the Fingerprint Data Base. Instead, the query fingerprints are merely processed and matched, one query fingerprint at a time. Each query fingerprint is used to look up the Fan Tree to retrieve the list of relevant candidate fingerprints to match against. Once the matching process of a given query fingerprint is complete, the query fingerprint is discarded, and only the matching results in terms of the match counter array continue to accumulate per query page from one query fingerprint to the next.

A second difference is that in the embodiment of this application, the Sort Permutation step 1650 in FIG. 16 is only applied during the original document collection fingerprinting step. In contrast, the query fingerprinting process requires no Sort Permutation step. This is because the permutations are generated in advance during the preparation phase of the document collection. During query time, however, only one permutation, the first one to occur, is used. It does not matter which permutation is used during query time since all the possible permutations have been prepared and registered in advance. Therefore, any single permutation, whatever it may be, should have a corresponding match within the Fan Tree data structure.

Returning attention to FIG. 19, in the query fingerprinting process 1900 the input to the query fingerprinting module is the list of candidate query keypoints (e.g., 1895 of input query image 1805 of FIG. 18) that is outputted by the Query Keypoint Identification module 1905 as described in section I.c.1 above. The number of candidate keypoints depends on the query image content. Typical machine printed pages usually have hundreds to thousands of candidate keypoints. A blank page, on the other hand, may have no keypoint candidates at all. A test is thus made in the beginning to verify that there is sufficient number of candidate keypoints at the input. If the number of candidate keypoints is too small (below a given threshold), the query image is rejected and a notification message is sent to indicate the process has failed to identify a sufficient number of keypoints on the query page. The robustness and repeatability of these keypoints can be demonstrated by subjecting the input image to a multitude of distortions and showing that the majority of the keypoints can still be repeatedly and reliably found with high probability in the distorted image. For example, it can be shown that the keypoints obtained in accordance with the embodiment of this application are robust to noise, lighting conditions, and perspective distortions such as skew, warp, rotation, translation, scale, resolution change, etc.

The proposed fingerprinting method in accordance with this application is a based on the sequence of quantized 2D ratios, called persistent ratios (described below), which are derived from the relative 2D positions of the given keypoint and its (N−1) nearest-neighbor keypoints. Thus each fingerprint is localized to a small image neighborhood around the keypoint of interest. A fingerprint content is only dependent on the relative 2D geometry between the keypoint of interest and its (N−1) closest keypoint neighbors. The number of neighbors N is a design parameter that influences the fingerprint strength.

As before, the Fingerprint processing 1900 begins in FIG. 19 with the Keypoint Triangulation module 1910 described in section I.c.1 above. The triangulation algorithm of this module is used for connecting neighboring keypoints using line segments in such manner as to fill the plane with the smallest adjacent non-overlapping triangles based on the relative distance of points. A well known example is the Delaunay triangulation algorithm. In the query fingerprinting context, the Triangulation module 1910 is used as a convenient and efficient means for determining the closest keypoints (in terms of planar distance between keypoints) to any given keypoint in the candidate query keypoint list. In addition, any number of the closest keypoints can be ranked in order of increasing distance from a given keypoint using the triangulation results by following the line segment links from one keypoint to the next, starting from the given keypoint location. Thus the Delaunay triangulation results can be effectively used to identify the closest query keypoints in a local neighborhood around the given query keypoint location. As stated above, an embodiment of this application is seeking to use localized neighborhood information since the assumptions of perspective geometry (between camera and the source image), planar surfaces, varying illumination, and lens non-linearity effects are far less pronounced in local neighborhoods than large distances. Therefore the use of local neighborhood fingerprints greatly improves the robustness of the proposed method of this application.

Note that the Triangulation module 1910 is applied only once for the entire list of candidate keypoints. The triangulation results are then stored in memory and then subsequently used with each individual fingerprinting process. The triangulation result in accordance with the embodiment of this application is the list of connecting line segments from each query keypoint to its closest nearest neighbors, organized by query keypoint order to facilitate efficient search.

Once the Triangulation process 1910 is complete, each candidate query keypoint is considered as a query fingerprint candidate. The candidate keypoints are processed one at a time. The current candidate query keypoint Qp is selected sequentially from the input list 1905 by the Next Keypoint module 1920. For each query keypoint Qp, the Find Nearest Neighbors module 1930 identifies the N nearest keypoints with the closest distance to the given keypoint Qp, where N is a given number. The Find Nearest Neighbors module uses the triangulation result 1910 to return a list of the closest query keypoints to Qp, sorted by increasing distance from Qp. The first element of the returned list is always the current query keypoint Qp with a distance of zero. The number N is a programmable system parameter as indicated above. A larger value of N will tend to make the fingerprint stronger more distinctive by adding more neighbor keypoints, while simultaneously increasing the average fingerprint area and computational complexity. In the embodiment of this application the values of N=8, 12, or 16 have been successfully used.

The output of the Find Nearest Neighbors module 1930 is the list of N nearest query keypoints (including the current query keypoint as the first entry). An important aspect of this application is to be able to recognize and match fingerprints at any orientation. It is often unrealistic to expect perfect registration between the original input image and the query image. The query image may be skewed, rotated, or generally perceptively transformed relative to the original input image. Therefore, a key aspect of the embodiment of this application is the use persistent ratios as the fundamental matching features since their values are invariant to affine or perspective transformations.

The purpose of the Sort in Clockwise Order module 1940 is to eliminate the aforementioned rotational dependency by sorting the list of N nearest neighbors in increasing clockwise orientation order. The choice of clockwise or counterclockwise is arbitrary, as long as it is consistently done in the same direction as for the original document collection. The starting nearest neighbor list is of course sorted by increasing distance order (as necessary to determine the nearest neighbors). The query keypoints are sorted in increasing orientation order in the same manner as for the original document collection. In sorting by orientation order, it is important to stabilize the center of origin in the same manner as before. The Sort in Clockwise Order module 1940 sorts the query keypoints in increasing clockwise orientation order. The sorting is done on both the orientation and distance. The primary order is by increasing clockwise orientation order. However, if two or more query keypoints have roughly the same orientation (the difference within a predefined tolerance level), the query keypoints are sub-ordered by increasing distance for all the keypoints of about the same orientation. This helps to stabilize the keypoint order and prevent small noise and/or finite accuracy errors to have a dramatic effect on the ordering.

An aspect of this application is in making the fingerprints robust to perspective image distortions (such as skew, warp, rotation, translation, scale, change of resolution, etc.) that commonly occur during the process of scanning or taking a picture of the image with a digital or a cell phone camera. At best, it is rather difficult to estimate the camera position and viewing angle in relation to the image without a reference image to compare against. However, storing reference image content will not only considerably increase the memory requirements—and the time it takes to match the scene with a candidate reference image—as to quickly render the system impractical for even moderate collection sizes. Instead, the present application proposes to utilize persistent perspective fingerprints, that have the same constant value regardless of the image rotation, translation, and scale, etc. Thus the resulting fingerprints will be robust under any perspective distortion.

For perspective transformations of locally planar objects, it has been well known in the art that for any given four non co-linear points {A, B, C, D} on the object surface, the ratio of triangle areas (ABC/ACD) remains constant under any perspective transformation. Hence only 4-points are needed to calculate one triangle area ratio under the perspective transformation. The perspective transformation has been shown to provide a good suitable model for describing the camera to planar object geometry in many practical situations. Therefore use perspective transformation in the reduction to practice as outlined in the embodiment of this application. However, in yet other embodiments of this application the proposed method can be extended to handle higher transformations as well. For example, a perspective transformation will require 5-points instead of 4-points to calculate a single persistent ratio, which is the product of two triangle areas ratios.

In the context of the embodiment of this application, a persistent fingerprint is comprised of the sequence of quantized transformation ratios for a group of N nearest neighbor keypoints sorted in clockwise order. To keep the fingerprint size small, the transformation ratio is quantized to Q-levels, where the quantity Q is a binary power of two.

After sorting the list of N nearest neighbors by clockwise orientation as described above, the Query Fingerprinting process starts the sequence of generating individual query fingerprints.

The Exclude Keypoint module 1950 generates the sequence of potential candidate query fingerprint combinations by allowing a number E of the fingerprint keypoints to be missing and still be able to detect the query fingerprint with high accuracy. For instance, if a query fingerprint is based on using a local neighborhood of N=8 keypoints, for example, the Exclude Keypoint module 1950 generates the sequence of all possible candidate query fingerprints with one query keypoint E=1 missing at any given time. Starting with the first query keypoint missing, the Exclude Keypoint module 1950 proceeds to generate the sequence of all possible combinations of candidate query fingerprints using the seven other query keypoints, excluding the first query keypoint. Once this is completed, the Exclude Keypoint module 1950 proceeds to generate the next sequence of all possible combinations of candidate fingerprints using the first query keypoint and the six last query keypoints, excluding the second query keypoint. The process repeats in this manner, each time excluding a different query keypoint from the set of N, until all excluded query keypoint combinations have been encountered. In the above example, since there are N=8 query keypoints per query fingerprint, the number of possible combinations with one excluded query keypoint is 8 in this case. The operation of the Exclude Keypoint module 1950 is similar as previously described.

Note that in other embodiments of this application that do not exclude any keypoints, the Exclude Keypoint module 1950 is bypassed, passing the sorted list of N nearest neighbor query keypoints directly to the output without excluding any query keypoints.

The Next Subgroup Combination module 1960 selects the current subgroup of P query keypoints (P<N) from among the sorted list of (N−E) nearest neighbor query keypoints, where P is the number points needed to calculate a single persistent ratio for the underlying transformation (P=4 for affine transformation, or P=5 under perspective transformation, etc.). The P neighbor query keypoint subgroups are processed sequentially, one at a time. The system proceeds to select all the possible P subgroup combination in a systematic and consistent manner. The total number of such P subgroups is determined by the number of combinations for choosing unique P keypoints out of (N−E) query keypoints. For example, if N=8, E=1 and P=4, the number of possible subgroup combinations is 35 persistent ratios.

For each unique query subgroup combination, the Add Quantized Ratio module 1970 calculates a single persistent ratio in accordance with the method described above, and proceeds to quantize it using a set of predefined thresholds as described above. The number of quantization levels Q is a design parameter. The fingerprint strength slowly improves with the number of quantization levels. A good tradeoff between accuracy and small signature size for machine printed text documents is obtained with Q=8 or Q=16 levels. The quantization thresholds are determined empirically by studying the distribution of persistent ratios for a large collection of machine printed text documents. It is important to maintain the same quantization level as for the document collection in order to facilitate a straightforward fingerprint matching.

In one embodiment of this application, Noise Guard module 1971 is introduced as an improvement to help achieve superior query fingerprint matching in the presence of noise. The Noise Guard module 1971 is designed to address the case where one or more of the triangle ratios in the query fingerprint sequence happen to fall very close on either side of one of the quantization thresholds. There is no way to know which side of the quantization threshold is the correct side. For example, suppose that the observed value of a triangle ratio is of 8.500001 and the quantization threshold for the level Q='3' has the value of 8.5. Since the triangle ratio is larger than the quantization threshold (no matter by how little), the straightforward result is to quantize it as the level '3'. However, it could well be that the value of the triangle ratio is actually below 8.5, and it was due to a bit of noise or some arithmetic rounding errors with finite precision that have caused the observed ratio to cross the threshold. In the latter case, the desired quantization level should of course be '2', not '3'. Without the Noise Guard module 1971, there is a 50% probability that the quantization result will be the correct one. If the wrong quantization value is picked up because of the noise, the resulting query fingerprint will fail to match the original document fingerprint.

Based on the above description it becomes readily apparent that the standard quantization scheme has a drawback in its sensitivity to noise in the immediate proximity of the quantization threshold values. A little bit of noise or arithmetic precision rounding errors can throw off the quantization level and cause the query fingerprint matching to fail (for this fingerprint). In an embodiment of this application, the Noise Guard module 1971 is introduced to detect this situation and take a corrective action. The Noise Guard module 1971 monitors the current triangle ratio value before quantization. If the distance from this value to one of the given quantization thresholds is too small below a pre-specified parameter, the Noise Guard module 1971 generates both quantization sequences with '2' and '3', for example, as two possible candidates, such that the correct choice is always included among the resulting candidates.

An advantage of using the Noise Guard module 1971 is that it improves the fingerprinting robustness by reducing the quantization noise sensitivity. However, this is accomplished at the expense of additional computations, since each time the quantization falls near the threshold, the number of candidate fingerprint sequences is doubled. However, the event of a triangle ratio falling near the threshold is quite rare (depending on the query image noise level), so the impact, on average, is not very significant. In addition, a maximum limit is set on the number of times that the Noise Guard is applied in each fingerprint in order to maintain the overall performance level (since a fingerprint with many ratios falling near the quantization thresholds is not very distinctive). In one embodiment of this application, the Noise Guard module, with a maximum limit of 5 digit changes, or 2^5=32 different fingerprint sequences, was demonstrated to improve the overall matching performance with only a slight increase in time.

The process of calculating and adding the next quantized ratio to the query fingerprint sequence continues sequentially, one persistent ratio at a time, until the last combination of query keypoints is detected by the Last Combination module 1975. If the current P subgroup combination is not yet the last combination 1976, the Last Combination module 1975 routes the flow back to the Next Subgroup Combination module 1960, to obtain the next P subgroup and proceed to calculate and add its quantized persistent ratio to the query fingerprint sequence. This process continues until the last P subgroup combination has been processed 1977. At this time, the resulting query fingerprint sequence is sent to the First Permutation module 1980.

The First Permutation module 1980 operates in a similar manner to a Sort Permutation Module. However, in the query case, the First Permutation module 1980 does not generate all the possible permutations. It only generates a single permutation—the very first one. The fingerprint sequence is permuted in order to address the problem that the query image may be in a different orientation relative to the target input image that is used to generate the fingerprints in the Fingerprint Data Base (e.g., 350 of FIGS. 3A, 3B). For example, the query page may be rotated, mirrored, horizontally or vertically flipped, skewed, sheared, and/or scaled under the assumed perspective transformation. It is generally difficult and time consuming to accurately determine the aforementioned perspective transformation parameters by the analysis of arbitrary image content, particularly in situations where the query image may have some missing or partially occluded portions of the original image, or when new content not in the original target scene is introduced. Likewise, the query image may have been taken at a different time of day, season, or scene illumination (e.g., with respect to the sun position and shadow detail, etc.) relative to the target image in the collection.

One benefit of this application is that the quantized values of the fingerprint ratios should hold the same values under any perspective transformation regardless of the perspective transformation parameters.

However, even when the individual quantized ratios are the same, the particular sequence of quantized ratios of a given fingerprint depends on the particular ordering of its keypoints. Since the query image may have a different orientation relative to the corresponding original target image, the order of the keypoints in each image could be different. The purpose of the permutation step 1980 is to put the query fingerprint sequence into the same sequence order of the corresponding fingerprint sequences of the document collection which are stored inside the Fan Tree structure, such that the query and document fingerprint sequences could be directly compared in a fast and efficient manner.

In the embodiment of this application, the candidate fingerprint sequences are permuted in accordance with the smallest least common quantization digit method. The histogram of the fingerprint digit sequence is performed to determine the smallest least common quantization digit. The digits of the fingerprint sequence are counted to determine how many there are of each value type. The smallest least common digit is the smallest least frequent digit that appears at least once in the fingerprint sequence, that is, with the smallest non-zero count.

After determining the value of the smallest least common digit in the query fingerprint sequence, the sequence is scanned to determine the first position of the smallest least common digit within the fingerprint sequence. For this position, the beginning portion of the sequence up to the location of the smallest least common digit is permuted to the end of the fingerprint sequence, while keeping the internal sequence within the beginning and end portions unchanged.

Considering an example fingerprint, which has two permutations in accordance with an embodiment of this application:

Original Fingerprint = "146036163767563263224776626522206667"
                          ^                              ^

Permutation 1 = "0361637675632632247766265222066671461467146"
                                                           ^

Permutation 2 = "0666714603616376756326322477662522206667"
                 ^

The smallest least common digit '0' is found at positions 3 and 30 of the original fingerprint sequence. The positions are indicated by the '^' marker underneath the original fingerprint sequence. The first permutation, Permutation 1, is formed by shifting the beginning sequence '146' of the sequence, from the first sequence digit up to the first location of the smallest least common digit '0', and reattaching it at the end of the sequence, past the last digit. The '^' marker under the permutation indicates the location where the shifted part begins in the permuted sequence. Likewise, the second permutation, Permutation 2, is similarly obtained by shifting the first 30 digits locations.

In an embodiment of this application, the First Permutation module 1980 returns only the first permutation, Permutation 1 in the above example. Permutation 1 is the considered the first permutation since it is the first to be found (at position 3 of the fingerprint sequence) while searching from the start of the sequence. Unlike the Sort Permutation module 1650 of FIG. 16, which returns all the permutation of the fingerprint sequence, the First Permutation module 1980 stops upon finding the first location of the smallest least common digit, and returns only the first permutation of the query fingerprint sequence.

The permuted query fingerprint sequence is used instead of the original query fingerprint sequence. The advantage of using permutation is that it considerably reduces the number of candidate fingerprint sequences that need to be matched against. Rather than examining all the possible cyclic combinations of original fingerprint sequences, only a few permutations of the smallest least common digit are investigated. All the possible permutation are generated and stored in advance during the Fingerprint Data Base preparation. At query time, however, the first permutation of the query fingerprint sequence is used for the matching. At query time, there is no need to use the additional permutations beyond the first one since all the possible permutations have already prepared in advance, and the correct one will be automatically found during the matching process. The use of permutations in accordance with the embodiment of this application provides a significant performance boost at a slight storage increase, since the number of permutations, on average, is much smaller than the original fingerprint sequence length.

The permuted query fingerprint sequence is then matched in the Match Fingerprint module 1981 against the relevant document collection fingerprints using the Fan Tree method of this application. If there is no match 1982 for the current fingerprint sequence, the process moves on to check if this is the last excluded keypoint combination 1990. If not the last excluded keypoint combination 1991, then the procedure returns to the Exclude Keypoint module 1950, otherwise, if "YES" 1992, the Last Keypoint 1995 is queried. More details of the Match Fingerprint module 1981 are described in the following sections.

The first time that a match is found for a particular query fingerprint combination, the Update Match Counter Array module 1985 increments the observed count of matching fingerprints for the collection document which contains the matching fingerprint. In addition, once a first match is found, there is no need to continue to check additional query fingerprint combinations for the current query fingerprint. Therefore, the flow out of the Update Match Counter Array module 1985 is routed, when a match is found, to the Last Keypoint module 1995 as if all the excluded query keypoint combinations have already been completed.

Otherwise, if the current query fingerprint combination does not match any of the relevant candidate fingerprints for the document collection, the flow is routed back to the Exclude Keypoint module 1950 to process the next candidate query fingerprint combination, with the next query keypoint excluded. This process continues until all the possible combinations of excluded query keypoints have been checked for potential matching against the relevant document collection fingerprints, including any additional query fingerprint combinations that are generated by the Noise Guard module 1971 as described above.

Finally, the process of matching the query fingerprints continues sequentially, one query fingerprint at a time, for all the remaining query keypoints 1996, until the last query keypoint is detected 1997 by the Last Keypoint module 1995. If the current query keypoint combination is not yet the last query keypoint, the Last Keypoint module 1995 routes the flow back to the Get Next Keypoint module 1920, to obtain the next query keypoint and proceed to repeat the steps to calculate and match the query fingerprint against the relevant document collection fingerprints. The Fingerprint Matching process continues in this manner until the last query keypoint combination of the last corresponding fingerprint has been processed and the outcome of its matching has been added to the Match Counter Array 1985 for the entire query image and the process ends 1999.

I.c.4. Counting Query Fingerprint Matches

This section describes in detail of the Fingerprint Matching module 1981 in FIG. 19. There are several things to keep in mind in order to make the fingerprint matching fast and efficient.

The Query Fingerprint Matching module 1981 includes and utilizes three types of data array structures in memory in order to keep track of the matching results:

(a) The SeenDocs array contains a list of document IDs that have been encountered so far during the current query fingerprint matching. The SeenDocs list is cleared with the start of each new query fingerprint combination.

(b) The SeenFinger array contains a list of fingerprint IDs per document ID that have been encountered so far during the current query fingerprint matching. The SeenFinger array is cleared for each new query image.

(c) The MatchCount array contains a list of counts of matching fingerprints per document ID that have been encountered so far during the current query fingerprint matching. The MatchCount array is cleared for each new query image. Note that in the embodiment of the present application, a sequential image index number is conveniently assigned to document images in the arrays (b) and (c) above. The conversion from image index to unique image ID number is maintained in a separate data structure.

Figure 20:
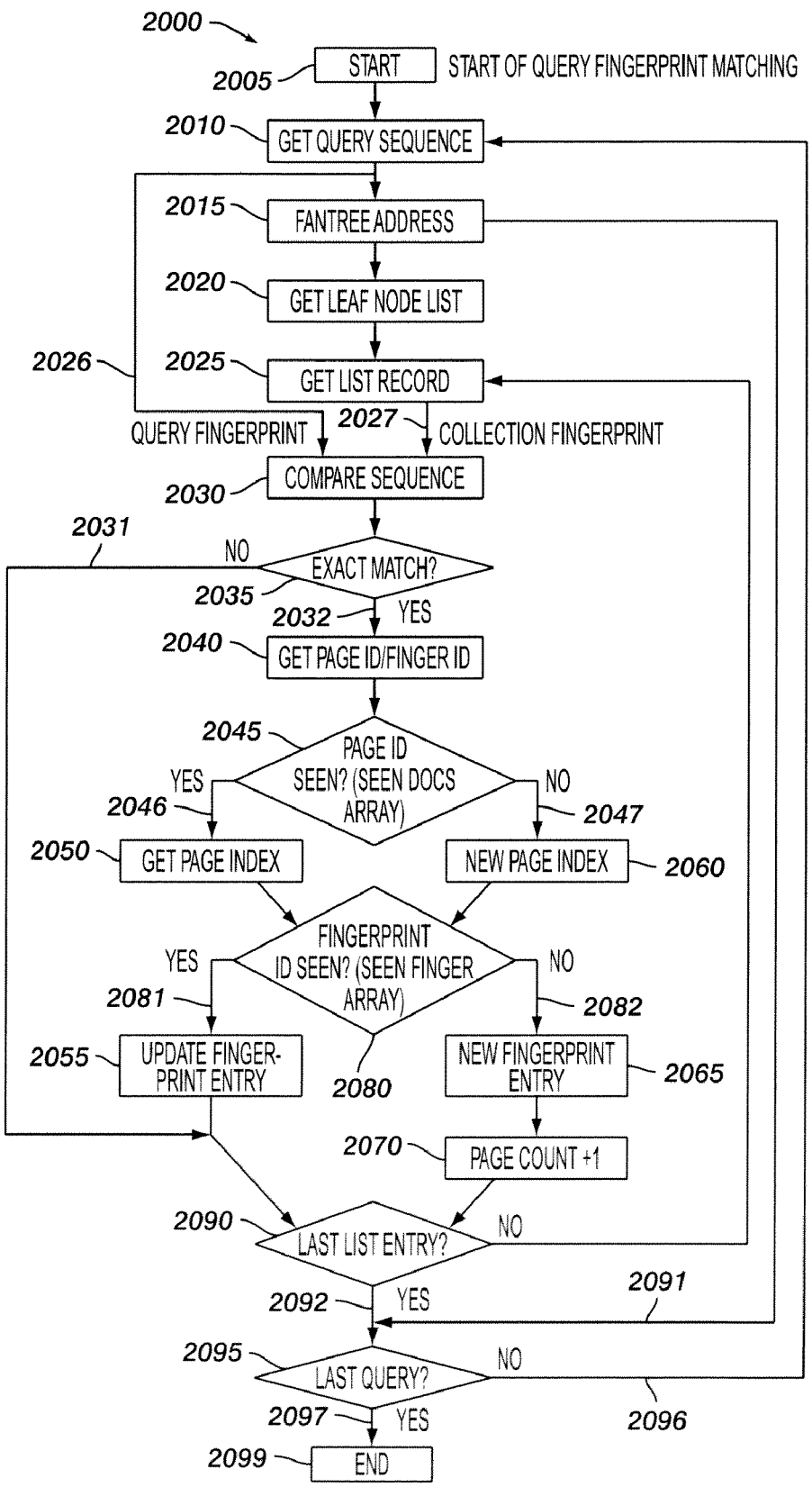
FIG. 20 is a flow diagram of the steps for Matching Query Fingerprints and Counting Document Hits.

The detailed block diagram of the Fingerprint Matching module 1981 is shown in FIG. 20. The fingerprint matching process 2000 begins (i.e., START 2005) with a query fingerprint combination sequence from the output of the First Permute module 1980. The query fingerprint combination has been permuted in accordance with the least common quantization digit as described above. The Get Query Sequence module 2010 obtains the current query fingerprint combination sequence to be matched from the available set.

The Fan Tree Address module 2015 uses the current query fingerprint sequence to follow the fingerprint path in the Fan Tree structure. In the rare event that at any point along the Fan Tree path the current tree node leads to a dead end (i.e., an unpopulated tree node), the matching of the current fingerprint is terminated and the process is routed to the Last Query module 2095 to move on to the next query fingerprint sequence to be matched (i.e., 2096) or to End the process 2099 if this was the last query fingerprint. The case of an empty tree node is an unusual situation. It can happen when the current query fingerprint sequence has been severely degraded by distortion and noise that cause the quantized query fingerprint sequence to no longer match. If it happens to just a few fingerprint combinations (out of thousands for a given page) the empty node cases could simply be ignored. However, if a large number of the query fingerprints begin to exhibit this behavior (leading to empty tree nodes), than it is a good indication that the query image may not have a similar matching image within the document collection.

In the normal situation, the Fan Tree Address module 2015 follows the current query fingerprint path through the Fan Tree, starting from the root node, and terminating in a Leaf node. The Get Leaf Node List module 2020 retrieves the address of the corresponding Leaf node list, which contains the list of relevant fingerprint records to match against.

The Get List Record module 2025 then retrieves the current fingerprint record in the Leaf node list. The Get List Record module 2025 extracts the fingerprint sequence Collection Fingerprint 2027 from the fingerprint record and passes it to the output. The Compare Sequence module 2030 next compares the query fingerprint sequence Query Fingerprint 2026 with the current target fingerprint sequence 2027 from the Leaf node list. The Exact Match module 2035 looks for an exact match between the two fingerprint sequences, that is, each corresponding pair of quantized ratios having the same value. A single mismatch, even in one quantized ratio position, is sufficient to declare a no match. If an exact match between the query fingerprint sequence and the current Leaf node list entry is not found 2031, the flow is routed to the Last List Entry module 2090 to move on to the next Leaf node list entry, i.e., next candidate target fingerprint from the collection.

If, however, an exact match is found between the query fingerprint sequence and the current Leaf node list entry fingerprint sequence 2032, the Get PAGE ID/Finger ID module 2040 retrieves the current unique image ID and fingerprint ID from the current Leaf Node list record (previously generated). The Page ID Seen module 2045 looks up the unique image ID in the SeenDocs array to determine if the current document has already been encountered during the current query fingerprint match. If it has already been encountered 2046, the Get Page Index module 2050 retrieves the corresponding page index of the current document from the mapping table using the unique image ID number. Otherwise 2047, the current document is a new document that has not yet been encountered. The New Page Index module 2060 assigns a new page index number to the current document, and adds a new entry to the SeenDocs array using the unique image ID number to indicate that it has now been encountered. At the same time, the New Page Index module 2060 also adds a new entry to the Match Count array at the current page index address and initializes its value to zero as the initial match fingerprint count for this newly encountered page.

Next the Fingerprint ID Seen module 2080 checks to see if the current fingerprint ID obtained from the current Leaf Node list record 2040 has already been encountered during the current query fingerprint match. The reason for checking the fingerprint ID is that each fingerprint is entered multiple times in the Fan Tree, each time with a different combination of excluded keypoints. For example, in the case of N=8, E=1 and P=4, each fingerprint is entered 8 times in the Fan Tree, each time with a different keypoint excluded in order to allow for missing keypoints. However, as noted above, if all of the 8 keypoints are present in both query and target images (i.e., no missing keypoints), then all of the 8 combinations will end up being exact matches. Thus it is necessary to keep track of the Finger ID of each fingerprint to prevent situation where some documents get more counts by multiple fingerprint combinations of excluded keypoints than others. In the embodiment of the present application, the solution to this problem is by checking the fingerprint ID and making sure to increment the Match Count array only once for each fingerprint ID. The checking of a Fingerprint ID Seen 2080 is accomplished by means of the SeenFinger array. The SeenFinger array is cleared at the beginning of each query image. Upon the event of first encountering a particular Fingerprint ID, the corresponding Fingerprint ID entry in the array is made non-zero. Thus the status of a Fingerprint ID, whether previously encountered or not, can easily by tracked by the (zero or non-zero) state of each Fingerprint ID entry of the SeenFinger array.

If the current Fingerprint ID has already been encountered by the Finger ID Seen module 2080, there is no need to increment the Match Count array 2081. The Update Fingerprint Entry module 2055 merely updates the SeenFinger array with the page index and Fingerprint ID as necessary. If, on the other hand, the current Fingerprint ID has not already been encountered 2082 by the Fingerprint ID Seen module 2080, the New Finger Entry module 2065 allocates a new SeenFinger entry and sets up its content to be the current Fingerprint ID value 2040 for the current page index. In addition, since this happens to be the first time that this particular Fingerprint ID is encountered during the current query match, the 'Match Count+1' (PAGE Count) module 2070 increments the content of the Match Count array for the current page index by 1.

After the matching of the query fingerprint sequence with the current fingerprint sequence from the Fan Tree Leaf node is complete, the Last List Entry module 2090 checks to see if there are more target fingerprint entries in the Leaf Node list that have not yet been matched. If the current fingerprint record is not yet the last Leaf node entry 2091, the List Entry module 2090 routes the flow back to the Get Record module 2025, to obtain the next target fingerprint record from the Leaf node list and proceed to match it with the query fingerprint sequence. This pair wise matching process continues until the last target fingerprint record has been processed 2092.

After all the fingerprint records in the current Leaf node list have all been retrieved and fingerprint matched against the current query fingerprint sequence, the procedure moves on to the Last Query module 2095. If this is not the last candidate query fingerprint sequence 2096, the process is routed back to the Get Query Sequence module 2010 to process the next candidate query fingerprint combination and proceed to match it against its own Leaf node list of relevant target fingerprint sequences. This continues until all the possible combinations of query fingerprint sequences have all been matched against the relevant Fan Tree content 2097.

The end result of the fingerprint matching process is the Match Count array content, which contains the count of matching fingerprints for each document in the collection that has at least one matching fingerprint with the query image 2099. The number of entries in the Match Count array is the same as the number of new documents that have been encountered during the query matching process. Note that the documents entries in the Match Count array are addressed by their running page index. However, the page index can easily be converted to the unique image ID number by looking up the mapping table that is created during the query matching process.

Finally, the matching results in the Match Count array are forwarded to the Fingerprint Analysis module 1760 in FIG. 17 for final scoring analysis and determination of the best matching document or document set in the collection.

I.c.5. Final Decision

During the query fingerprint matching process the Match Counter array accumulates the number of matching fingerprints for each of the relevant documents that have at least one matching fingerprint with the query image. Typically, one document in the collection, the matching document, will have many matching fingerprints (a high count), while a handful of other documents may have a few occasional matching fingerprints, particularly when the collection size is large.

The resulting content of the Match Counter array is forwarded to the Fingerprint Analysis module 1760 in FIG. 17 for final score analysis and determination of the best matching document or set of documents within the collection. There could be a number of possible matching objectives. If the objective is to find the best image match within the document collection, the image ID which has gathered the most fingerprint matches by highest score is returned. In addition, the match count can be used as confidence numbers to rule out any page matches that have fewer than a pre-specified minimum number of fingerprint matches to rule out occasional few stray counts due to distortion and/or noise. The counts can also be normalized by the total number of fingerprints on a page to provide a more uniform measure since some pages may have many more fingerprints than others, depending on the image content.

Alternatively, the objective may be to return the list of all matching images within the collection or a subset thereof that meet a pre-specified minimum of matching fingerprint counts or a minimum confidence level as above.

In one embodiment of the present application, the original image area may be subdivided with or without overlapping into a grid of subimages, and the fingerprint matching analysis be carried separately in each sub-image in order to provide a rough density profile of the areas where good fingerprint matching is obtained. The latter analysis is particularly suitable for situations where some of the original image may be missing or partially obscured by other objects in the scene. In this case, the common image areas between the query and the original not missing or obscured will still have a high degree of matching fingerprint counts.

In yet another embodiment of the present application, the zoning of the image by dividing into sub-images as outlined above can be used to emphasize the weight of certain image areas over others. For example, giving more weight to fingerprint matches near the center of the image (where the focused object may be and less weight to fingerprint matches on the outer periphery. This approach is particularly useful for eliminating frame boundary artifacts along the image outer boundary. For instance, when matching images from different sources such as an electronic original and a captured image such as, but not limited to, a scanner or cell phone camera or a printed version of an image where the captured image may include some of the border or white paper frame that is not part of the original image. The latter technique can also be used to effectively prevent the formation of candidate keypoints along the image boundary due to the introduction of artificial background, such as, but not limited to, rotated image corners against paper white, or blue screen, etc.), by utilizing the above image zoning technique.

With continuing attention to FIG. 17, the output of the fingerprint analysis module 1760 is the final list of one or more matching image IDs. In a next step (performed by Document URL Lookup module 1780), the list is converted from the internal unique image ID integer representation to the true document URL (Universal Resource Locator), which identifies the location of the matching document or document set and the corresponding page numbers. The inverse mapping table, which is created by the Unique Image ID module (540 of FIG. 5) at the time of fingerprint database 550 generation, is used to look up the document URL using the unique image ID as an index to the table. At this point, the matched target document may be printed out, electronically transmitted, displayed and/or stored by one of the components of FIG. 1. It is to be understood in the foregoing discussion the use of the word module may also be understood to include a step and/or steps being performed in the method of the system.

Summary

The following paragraphs summarize aspects of the present application which have been described above.

1. The method and system of the present application replaces the hashing scheme for matching fingerprints between the query image and candidate fingerprints in the document collection. Instead of a hashtable, a tree-based method called a Fan Tree is used. Unlike existing conventional hashing methods, the Fan Tree allows for efficient near-neighbor searching in a high-dimensional space. Therefore a Fan Tree structure of the present application more readily supports lookup of near-misses of fingerprints in candidate or potential target document images, such as fingerprints that are identical to fingerprints in a query image, within a set or predetermined tolerance, such as being identical except for one or a few digit changes. This leads to more votes for correct document matches while not adding many superfluous background votes for incorrect document matches. The Fan Tree is at least as fast as the hashtable approach.

2. Described is a method and system for selecting superior fingerprints by measuring fingerprint strength. The method and system is based on analyzing the fingerprint digit run-length sequence. A fingerprint with a smaller subset of digits overall, or with longer repeating sequences of the same digit or digit combinations, is less distinctive than other fingerprints. By retaining only the strongest most distinct fingerprints, the described method and system achieves significantly higher performance with minimal loss of accuracy, and the amount of memory for storing the document collection fingerprint information is substantially reduced.

3. Described is a method and system for computing fingerprints from neighborhoods of keypoints that reduce the number of equivalence classes found by permutation due to image rotation. The present approach is based on a new method of the Smallest Least Common Digit to substantially reduce the resulting number of fingerprint permutations.

4. Described is a method and system for dealing with the remaining permutations of fingerprints.

5. Described is a method and system of sub-group center of origin that is particularly useful to stabilize the ordering of keypoints in each localized fingerprint neighborhood. The center of origin is computed from a smaller subset of the closest keypoints to allow for missing or extra keypoints due to affine or perspective transformations. The method overcomes the aforementioned problem with the ordering of co-linear keypoints, frequently occurring with text words in lines or columns, thereby greatly improving the robustness of keypoint ordering to noise and rounding errors, and leads to improved fingerprint matching between the query and target document image.

6. A Noise Guard method and system has been described to overcome a drawback of the existing fingerprint quantization methods that have an undesirable sensitivity to noise near quantization thresholds. The Noise Guard method and system can be applied either offline during document collection pre-processing time, or online at query time. The problem occurs in situations where one of the distortion-invariant triangle-area ratios of a fingerprint results in a value that falls near one of the quantization levels (i.e., within a predetermined or set tolerance value), such that a small amount of noise may lead to the wrong quantized digit and fewer correct fingerprint matches. The present Noise Guard method and system examines the pre-quantized values, and in the event they fall close to a quantization level, within a pre-specified interval, both fingerprint combinations can be generated and processed on the fly.

7. A compact intermediate fingerprint data representation method and system has been described which uses memory efficiently. Instead of generating all the possible fingerprint permutations in advance and registering them in the hashtable or Fan Tree, only a minimum necessary set is generated, from which all the other needed permutations or combinations can be easily and systematically derived. The compact representation retains the fingerprint identity for each document. A second key advantage of the compact representation is that it enables easy manipulation of the document collection fingerprint information, such as for adding or removing documents to the collection, without having to store and reprocess the original documents.

8. An advanced method and system of weighted fingerprint scoring analysis has been described. In this method and system, instead of using simple voting, the counts of matching fingerprints in one or more image zones is processed, possibly using different weights, in order to select the best matching document or document set in the collection. The weighting function can be used to emphasize certain image areas over others; For example, giving more weight to fingerprints at the center of the image area than at the periphery. Likewise, the confidence in a correct match between a query and target image can be increased by analyzing the distribution of resulting fingerprint match counts in each zone rather than relying on the total number of matches overall; A low fingerprint match count in a given zone might indicate a missing or otherwise obscured image area, for example. Finally, the confidence in a given query match can be estimated by counting the number of matching fingerprint in each zone and normalizing by the known number of fingerprints in the target image.

The claims can encompass embodiments in hardware, software, or a combination thereof. It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. An image management method for storing, indexing, searching, and/or retrieving image data comprising the steps of:
    identifying keypoints in images, including keypoints in a query image of a query document and keypoints in potential target document images of a collection of potential target documents;
    generating fingerprint information from the keypoints, wherein the fingerprint information and accompanying images are organized in a Fan Tree structure, which provides near neighbor searching in a high dimensional space, wherein the near-neighbor searching in the high dimensional space provided by the Fan Tree structure includes supporting looking up of near misses of fingerprints, including fingerprints which are less than identical fingerprints of the query image by a predetermined tolerance;
    comparing the fingerprint information of the query image with fingerprint information of the potential target document images in the collection of potential target documents;
    determining a best match between the fingerprint information of the query image and the potential target document images;
    retrieving at least one target document image based on the determining step; and
    at least one of displaying, printing, storing or transmitting the retrieved at least one target document image.

2. The method of claim 1, wherein a keypoint comprises: a consistently identifiable aspect of an image.

3. The method of claim 1, further including generating a minimum necessary set of possible fingerprint permutations, and registering the minimum necessary set in the Fan Tree, wherein the minimum necessary set is defined as being those fingerprint permutations from which all other needed permutations can be derived.

4. The method according to claim 1 wherein a center of origin of an image is computed from a subset of a group of keypoints determined to be the closest keypoints in a localized fingerprint neighborhood of an image.

5. The method of claim 1, wherein the image comprises text and one or more of handwritten text, symbols, line-art and graphic drawings, clip-art, charts, tables, spreadsheets, and document marks.

6. The method of claim 5, wherein the text searching is performed through use of centroids which calculate the visual center of an image.

7. The method of claim 1, wherein the fingerprints are computed using sequences of quantized transformation-invariant two-dimensional persistent ratios.

8. The method of claim 1, wherein the fingerprints are computed from neighborhoods of keypoints based on a smallest least common quantization digit process applied to a sequence of digits representing the fingerprint, the least common quantization digit process including,
    determining a value of the of the smallest least common digit in the fingerprint sequence,
    scanning the sequence to determine positions of the smallest least common digit within the fingerprint sequence, and
    permutating, for each position in the fingerprint sequence, a beginning portion of the fingerprint sequence up to the location of the smallest least common digit to the end of the fingerprint sequence, while keeping the internal sequence of the beginning and end portions unchanged.

9. The method of claim 1, wherein the fingerprints are selected by measuring fingerprint strength based on analyzing fingerprint digit run-sequence.

10. An image management method for storing, indexing, searching, and/or retrieving image data comprising the steps of:
    identifying keypoints in images, including keypoints in a query image of a query document and keypoints in potential target document images of a collection of potential target documents;
    generating fingerprint information from the keypoints;
    comparing the fingerprint information of the query image with fingerprint information of the potential target document images in the collection of potential target documents;
    determining a best match between the fingerprint information of the query image and the potential target document images;
    retrieving at least one target document image based on the determining step; and
    at least one of displaying, printing, storing or transmitting the retrieved at least one target document image; and,
    applying a weighted fingerprint scoring analysis, which includes processing counts of matching fingerprints in selected image zones of the query image and the target images.

11. An image management method for storing, indexing, searching, and/or retrieving image data comprising the steps of:

identifying keypoints in images, including keypoints in a query image of a query document and keypoints in potential target document images of a collection of potential target documents;

generating fingerprint information from the keypoints;

comparing the fingerprint information of the query image with fingerprint information of the potential target document images in the collection of potential target documents;

determining a best match between the fingerprint information of the query image and the potential target document images;

retrieving at least one target document image based on the determining step;

at least one of displaying, printing, storing or transmitting the retrieved at least one target document image; and, applying a noise guard process in a candidate fingerprint selection process when one or more of determined triangle ratios in a fingerprint sequence of a query image falls within a predetermined tolerance level of quantization thresholds, wherein if a distance from a persistent ratio value to its nearest quantization threshold is below a pre-specified tolerance level, the noise guard generates each relevant quantization sequence of candidate fingerprints.

12. The method according to claim 11, wherein the noise guard is applied during document collection pre-processing.

13. The method according to claim 11, wherein the noise guard is applied during a query operation.

14. An image management system within a computer operable system for storing, indexing, searching, and/or retrieving image data comprising:

an identification module configured to identify keypoints in images, including keypoints in a query image of a query document and keypoints in potential target document images of a collection of potential target documents;

a fingerprint generation module configured to generate fingerprint information from the keypoints, wherein fingerprints of the fingerprint information are sequences of quantized transformation-invariant two-dimensional persistent ratios;

a comparison module configured to compare the fingerprint information of the query image with fingerprint information of the potential target document images in the collection of potential target documents;

a matching module configured to determine a best match between the fingerprint information of the query image and the potential target document images;

a retrieval module configured to retrieve at least one target document image based on the determining step; and at least one of an electronic display, a printer, a memory storage or a computer network to display, print, store or transmit the retrieved at least one target document image;

wherein a noise guard method is employed to compensate for errors.

15. The system of claim 14, wherein fingerprints and accompanying images are organized in a Fan Tree structure.

16. The system of claim 14, wherein the image capture hardware comprises at least one of:

a digital camera, cell phone with a camera, a scanner or a computer generated electronic image.

17. The system of claim 14, wherein the image comprises text and one or more of handwritten text, symbols, line-art and graphic drawings, clip-art, charts, tables, spreadsheets, and document marks.

18. The system of claim 17, wherein the text searching is performed through use of centroids which calculate the visual center of an image.

19. The system of claim 14, wherein the fingerprints are computed using sequences of quantized transformation-invariant two-dimensional persistent ratios.

20. The method of claim 1, where the keypoints are identified in each image solely based on visual image properties, with no assumptions of belonging to an object type, and without requiring any training images or complex training systems for learning object keypoint properties from a given set of supervised training images.

21. The method of claim 1, wherein the near-neighbor searching in the high dimensional space provided by the Fan Tree structure includes supporting looking up of near misses of fingerprints all by using a single image, no training images, and no preconceived notions of specific three-dimensional objects in computer vision.

\* \* \* \* \*